United States Patent
Dodman et al.

(10) Patent No.: US 8,152,189 B2
(45) Date of Patent: Apr. 10, 2012

(54) BICYCLE FRAME AND DRIVE LINK CASE THEREFORE

(75) Inventors: Christopher Philip Dodman, Basel (CH); Torgny Fjeldskaar, Basel (CH)

(73) Assignee: Cannondale Bicycle Corporation, Bethel, CT (US)

( * ) Notice: Subject to any disclaimer, the term of this patent is extended or adjusted under 35 U.S.C. 154(b) by 663 days.

(21) Appl. No.: 12/194,902

(22) Filed: Aug. 20, 2008

(65) Prior Publication Data

US 2009/0058038 A1   Mar. 5, 2009

Related U.S. Application Data

(60) Provisional application No. 60/968,232, filed on Aug. 27, 2007.

(51) Int. Cl.
*B62K 3/02* (2006.01)
*B62K 19/00* (2006.01)

(52) U.S. Cl. ........ 280/274; 280/261; 280/275; 280/278; 280/281.1; 280/287

(58) Field of Classification Search ................ 180/231; 280/259, 260, 261, 274, 275, 278, 281.1, 280/282, 283, 284, 285, 287, 288.2, 288.3
See application file for complete search history.

(56) References Cited

U.S. PATENT DOCUMENTS

| | | | | |
|---|---|---|---|---|
| 611,077 A | * | 9/1898 | Nies et al. | 280/261 |
| 619,322 A | * | 2/1899 | Lindsay | 280/261 |
| 622,526 A | * | 4/1899 | Nies et al. | 280/261 |
| 626,875 A | * | 6/1899 | Smith | 280/259 |
| 633,534 A | * | 9/1899 | Read | 280/261 |
| 635,082 A | * | 10/1899 | Stiles | 74/640 |
| 1,623,400 A | * | 4/1927 | Englund | 280/282 |
| 3,939,730 A | * | 2/1976 | DeHaan | 474/147 |

(Continued)

FOREIGN PATENT DOCUMENTS

DE   99178   9/1898

(Continued)

OTHER PUBLICATIONS

EP Search Report for EP Application No. 08252807.6-1254 dated Jun. 29, 2009 and Provisional Opinion on Patentability, 10 pages.

*Primary Examiner* — Kevin Hurley
*Assistant Examiner* — Marc Scharich
(74) *Attorney, Agent, or Firm* — Cantor Colburn LLP

(57) ABSTRACT

A bicycle frame includes a front section and a rear section. The front section includes a front frame portion having a front coupling configured to receive a front wheel support member and to allow rotation between the front coupling and the front wheel support member, the front frame portion defining a central vertical plane of the frame. The rear section includes a drive link case having an upper tube, a lower tube, a rear hub housing, and a front sprocket housing all integrally arranged with each other to form a rigid drive link case having an opening disposed between the upper and lower tubes, the drive link case being connected to the front frame portion via the front sprocket housing. The drive link case is disposed eccentric to the central vertical plane and is cantilevered rearward from the front sprocket housing. The front frame portion extends forward from the front sprocket housing.

22 Claims, 20 Drawing Sheets

U.S. PATENT DOCUMENTS

| | | | |
|---|---|---|---|
| 4,158,402 A * | 6/1979 | Romans | 184/15.1 |
| 4,170,369 A | 10/1979 | Strutman | |
| 4,911,458 A * | 3/1990 | Lin et al. | 280/278 |
| 5,398,955 A * | 3/1995 | Yeh | 280/287 |
| 5,413,368 A | 5/1995 | Pong et al. | |
| 5,772,225 A * | 6/1998 | Brackett | 280/216 |
| 6,267,401 B1 | 7/2001 | De Jong | |
| D507,995 S | 8/2005 | Okada | |
| 7,104,562 B2 | 9/2006 | Schmider et al. | |
| 7,114,737 B1 | 10/2006 | Rasmussen | |
| 7,217,037 B2 | 5/2007 | Dodman et al. | |
| 7,264,257 B2 | 9/2007 | Sanders | |
| 2002/0005624 A1 * | 1/2002 | Kang et al. | 280/259 |
| 2002/0167151 A1 | 11/2002 | Tseng | |
| 2003/0224891 A1 * | 12/2003 | Chou | 474/146 |
| 2005/0062254 A1 * | 3/2005 | Nicolai | 280/260 |
| 2007/0035106 A1 | 2/2007 | Thorpe | |
| 2008/0224530 A1 | 9/2008 | Frank | |

FOREIGN PATENT DOCUMENTS

| | | |
|---|---|---|
| DE | 581284 | 7/1933 |
| DE | 20219136 U1 | 3/2003 |
| DE | 202004004726 U1 | 6/2004 |
| EP | 1595784 A2 | 11/2005 |
| WO | W09962759 A2 | 12/1999 |
| WO | W02004087493 A1 | 10/2004 |

* cited by examiner

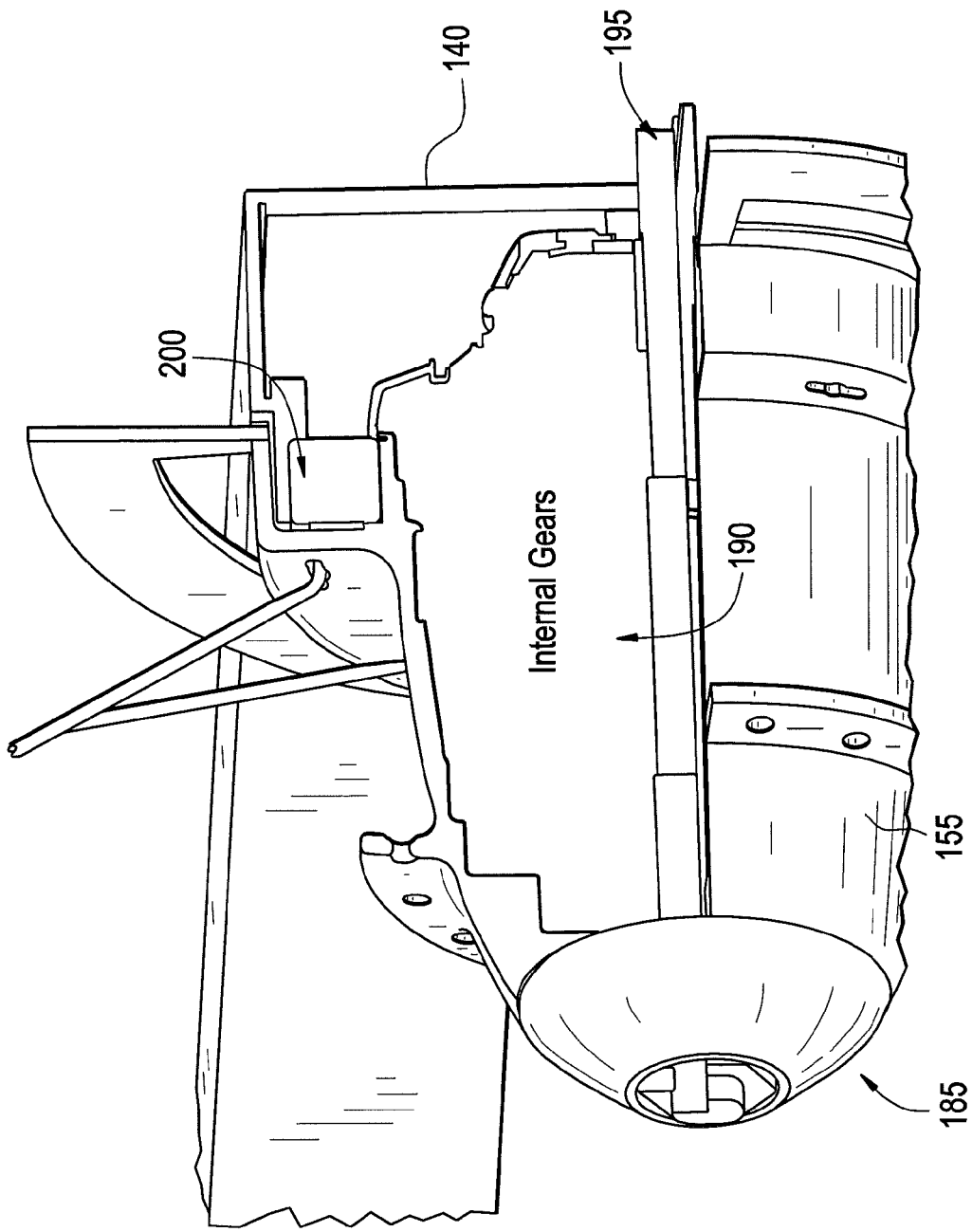

BICYCLE FRAME AND DRIVE LINK CASE THEREFORE

CROSS REFERENCE TO RELATED APPLICATIONS

This application claims the benefit of U.S. Provisional Application Ser. No. 60/968,232, filed Aug. 27, 2007, which is incorporated herein by reference in its entirety.

BACKGROUND OF THE INVENTION

The present disclosure relates generally to a bicycle frame, and particularly to features of a bicycle frame, such as the structural rear section of the bicycle frame, and a foldable bicycle frame.

SUMMARY

An embodiment of the invention includes a bicycle frame configured to receive front and rear wheels. The frame includes a front section and a rear section. The front section includes a front frame portion having a front coupling configured and dimensioned to receive a front wheel support member and to allow a rotational degree of freedom between the front coupling and the front wheel support member, the front frame portion defining a central vertical plane of the frame. The rear section includes a drive link case, the drive link case having an upper tube, a lower tube, a rear hub housing, and a front sprocket housing all integrally arranged with each other to form a rigid drive link case having an opening disposed between the upper and lower tubes, the drive link case being connected to the front frame portion via the front sprocket housing. The drive link case is disposed eccentric to the central vertical plane and is cantilevered rearward from the front sprocket housing. The front frame portion extends forward from the front sprocket housing.

Another embodiment of the invention includes a drive link case for a bicycle frame having an upper tube, a lower tube, a rear hub housing, and a front sprocket housing all integrally arranged with each other to form a rigid drive link case having an opening disposed between the upper and lower tubes. The upper and lower tubes are disposed non-parallel to each other. At least one of the upper tube and the lower tube has a cross-sectional height that is greater than a respective cross-sectional width. Material forming the upper tube is non-separable along its respective length and around its respective circumference, material forming the lower tube is non-separable along its respective length and around its respective circumference; material forming the rear hub housing is non-separable with the material forming the upper tube and the material forming the lower tube; and material forming the front sprocket housing is non-separable with the material forming the upper tube and the material forming the lower tube.

Another embodiment of the invention includes a bicycle frame configured to receive front and rear wheels. The frame includes a front section and a rear section. The front section includes a front coupling configured and dimensioned to receive a front wheel support member and to allow a rotational degree of freedom between the front coupling and the front wheel support member, the front section defining a central vertical plane of the frame. The rear section includes a drive link case, the drive link case comprising an upper tube, a lower tube, a rear hub housing, and a front sprocket housing all integrally arranged with each other to form a rigid drive link case having a centrally disposed window between the upper and lower tubes, the rear section being connected to the front section via the front sprocket housing. The drive link case is disposed eccentric to the central plane and being cantilevered rearward from the front sprocket housing, the front section extending forward from the front sprocket housing.

Another embodiment of the invention has the rear section rigidly connected to the front section.

Another embodiment of the invention has the rear section pivotally connected to the front section about an axis substantially normal to the vertical plane of the frame.

Another embodiment of the invention has the drive link case pivotally connected to the front section as in the form of a swing arm to allow suspension therebetween.

Another embodiment of the invention further includes means for suspension between the front section and the rear section.

Another embodiment of the invention includes a shock absorber with the means for suspension.

Another embodiment of the invention further includes a seat support fixedly attached to at least one of the front section and the rear section.

Another embodiment of the invention has the seat support fixedly attached to the front section.

Another embodiment of the invention has the rear hub housing of the drive link case configured and dimensioned to secure to and to form an enclosure over an exposed end of a bicycle torque converter assembly configured to transmit torque from a drive link to a rear wheel, where the drive link receives an input torque from a front sprocket within the front sprocket housing.

Another embodiment of the invention has for the drive link a bicycle drive chain.

Another embodiment of the invention has the drive link case configured and dimensioned to receive a bicycle drive chain disposed in a loop traversing a path extending from the front sprocket housing, through the upper tube, around the interior of the rear hub housing, through the lower tube, and returning to the front sprocket housing.

Another embodiment of the invention has the drive link case completely enclosing the bicycle chain.

Another embodiment of the invention has the bicycle torque converter including a set of gears having a plurality of gear ratios.

Another embodiment of the invention has for the bicycle torque converter a multi-speed internally geared hub.

Another embodiment of the invention has the rear hub housing including supports for supporting the axis of the torque converter assembly and for supporting torque reaction loads between the rear hub housing and the torque converter assembly.

Another embodiment of the invention has the drive link case including a chain tensioner support.

Another embodiment of the invention further includes means for tensioning the drive link.

Another embodiment of the invention has the front coupling further configured and dimensioned to receive a one-sided front wheel support member disposed eccentric to the central plane and disposed on the same side of the front section as the eccentrically disposed drive link case.

Another embodiment of the invention has the front sprocket housing closer to the central plane than is the rear hub housing thereby defining the drive link case to have an offset shape.

Another embodiment of the invention has at least one of the upper tube and the lower tube with a faceted tubular cross section.

Another embodiment of the invention has the drive link case further including an access window configured and sized to receive a hub gear shift cable.

Another embodiment of the invention has the rear hub housing including a removable cover to provide access to the interior of the rear hub housing.

Another embodiment of the invention has the front sprocket housing configured and dimensioned to receive an eccentric crank, the front sprocket housing further including an eccentric disc crank cover that is rotatable and removable to provide for installation of and alignment with the eccentric crank.

Another embodiment of the invention has the drive link case including means for mounting a disc brake caliper.

Another embodiment of the invention has the upper and lower tubes of the drive link case non-parallel to each other.

Another embodiment of the invention further includes a frame hinge disposed between the front section and the rear section, the frame hinge including means for: rigidly fixing the front section to the rear section such that the front and rear wheels are lockable in line with each other suitable for riding; pivotally displacing the front section with respect to the rear section such that the front and rear wheels are not in line with each other; and, holding via a detent the front section and rear section together in a pivotally displaced condition suitable for storage.

Another embodiment of the invention further includes a frame hinge, the frame hinge including an upper portion and a lower portion, each of the upper and lower portions having at least two interlocking features such that the interlocking features of the upper portion engage with the interlocking features of the lower portion, and a fastener or clamping mechanism disposed to rigidly fasten the upper portion to the lower portion. Wherein the interlocking features and the fastener or clamping mechanism provide for rigid fixation of the upper portion to the lower portion with the front and rear wheels disposed in line with each other.

Another embodiment of the invention is configured such that in response to the interlocking features of the upper portion and the interlocking features of the lower portion being engaged with each other, and in response to the fastener or clamping mechanism fastening the upper portion to the lower portion, the upper and lower portions of the frame hinge are prevented from having any relative movement between them, and in response to the fastener or clamping mechanism being loosened and not fastening the upper portion to the lower portion, the upper and lower portions of the frame hinge are prevented from having rotational relative movement between them until the upper and lower portions are partially separated from each other via translational relative movement between them.

Another embodiment of the invention is configured such that in response to the upper and lower portions being only partially separated from each other, a first of the interlocking features of the upper portion and a first of the interlocking features of the lower portion remain engaged with each other and act as a pivot, and a second of the interlocking features of the upper portion and a second of the interlocking features of the lower portion are disengaged from each other thereby allowing the upper portion to pivot on the lower portion about the pivot defined by the pair of first interlocking features.

Another embodiment of the invention has the first interlocking feature of the upper portion and the first interlocking feature of the lower portion each including a pass-through hole providing a through passage at the pivot from one side of the hinge to the other side for passage of cables therethrough.

Another embodiment of the invention has the front section including two parallel tubes extending substantially upward from the front sprocket housing of the drive link case, thereby defining a first portion of the front section, and then extending substantially forward toward the front coupling, thereby defining a second portion of the front section.

Another embodiment of the invention further including includes a rotatable joint disposed in the first portion of the front section and having a pivot axis in a near-vertical orientation, the rotatable joint including a clamping mechanism that rigidly clamps the first portion to the second portion in the central vertical plane in a manner to make the bicycle frame suitable for riding.

Another embodiment of the invention has the rotatable joint disposed in line with the rearward tube of the two parallel tubes of the first portion, the rotatable joint including an axial through opening in line with the opening of the rearward tube thereby providing a passage way for brake and shifting cables to run through the tubular first and second portions of the front section across the rotatable joint.

Another embodiment of the invention further includes a seat support attached to the front section via a seat support clamp that permits the seat support to be disposed in a first position suitable for riding and in a second position suitable for storing.

Another embodiment of the invention has the drive link case including a removable cover to provide access to the interior of the drive link case for removing and replacing a drive link that cannot be split apart.

BRIEF DESCRIPTION OF THE DRAWINGS

Referring to the exemplary drawings wherein like elements are numbered alike in the accompanying Figures:

FIG. 7 depicts in cross sectional view a torque converter assembly for use in accordance with an embodiment of the invention;

DETAILED DESCRIPTION OF THE INVENTION

An embodiment of the invention, as shown and described by the various figures and accompanying text, provides a bicycle frame having one or both of the following features: a rear chain case that serves as a structural member to support the rear bicycle wheel absent the need for a triangular rear section typical of bicycle frames employing two triangular frame sections; and/or, a hinge having a pivot axis in a near-vertical orientation to allow the bicycle frame to be folded substantially in half, front-wheel-to-rear-wheel. While embodiments described herein depict or imply a bicycle chain as a drive link (see drive link 385 in FIG. 21 for example) to transfer drive torque from a front crank sprocket to a rear wheel sprocket, it will be appreciated that the disclosed invention is also applicable to other drive links suitable for the purposes disclosed herein.

Figure 1:
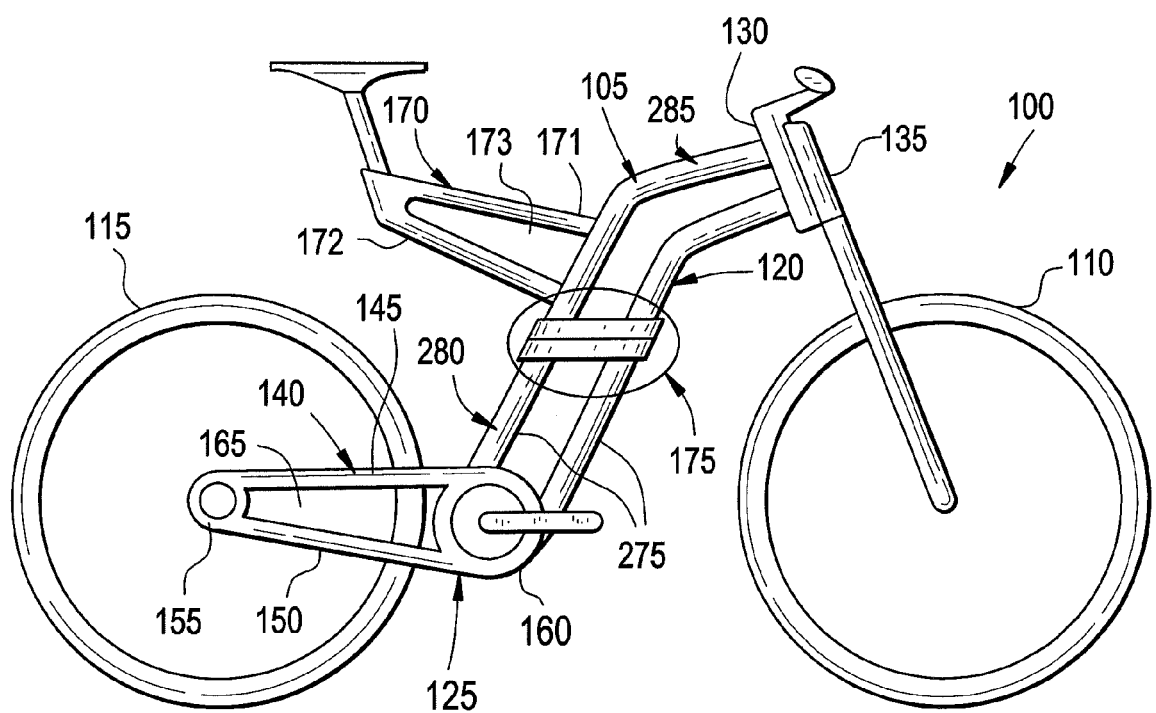
FIG. 1 depicts in right side view an exemplary embodiment of a bicycle in accordance with an embodiment of the invention.

FIG. 1 is an exemplary embodiment (right side view) of a bicycle 100 having a bicycle frame 105 configured to receive front 110 and rear 115 wheels. The frame includes a front section 120 and a rear section 125. The front section 120 includes a front coupling 130 configured and dimensioned to receive a front wheel support member 135 and to allow a rotational degree of freedom between the front coupling 130 and the front wheel support member 135, the front section 120 defining a central vertical plane of the frame 105. The rear section 125 includes a drive link case 140 having an upper tube 145, a lower tube 150, a rear hub housing 155, and a front sprocket housing 160, all integrally arranged with each other to form a rigid drive link case 140 having a centrally disposed open window 165 between the upper and lower tubes 145, 150. The rear section 125 is connected to the front section 120 via the front sprocket housing 160. The drive link case 140 is cantilevered rearward from the front sprocket housing 160, and the front section 120 extends forward from the front sprocket housing 160. A seat support 170 is fixedly attached to at least one of the front section 120 and the rear section 125, the seat support 170 having an upper support 171 and a lower support 172 with a opening 173 disposed therebetween. As depicted in FIG. 1, the seat support 170 is fixedly attached to the front section 120. A further feature of an embodiment of bicycle frame 105 is a hinge 175 for folding the bicycle frame in half, in a front-wheel-to-rear-wheel arrangement.

Figure 2:
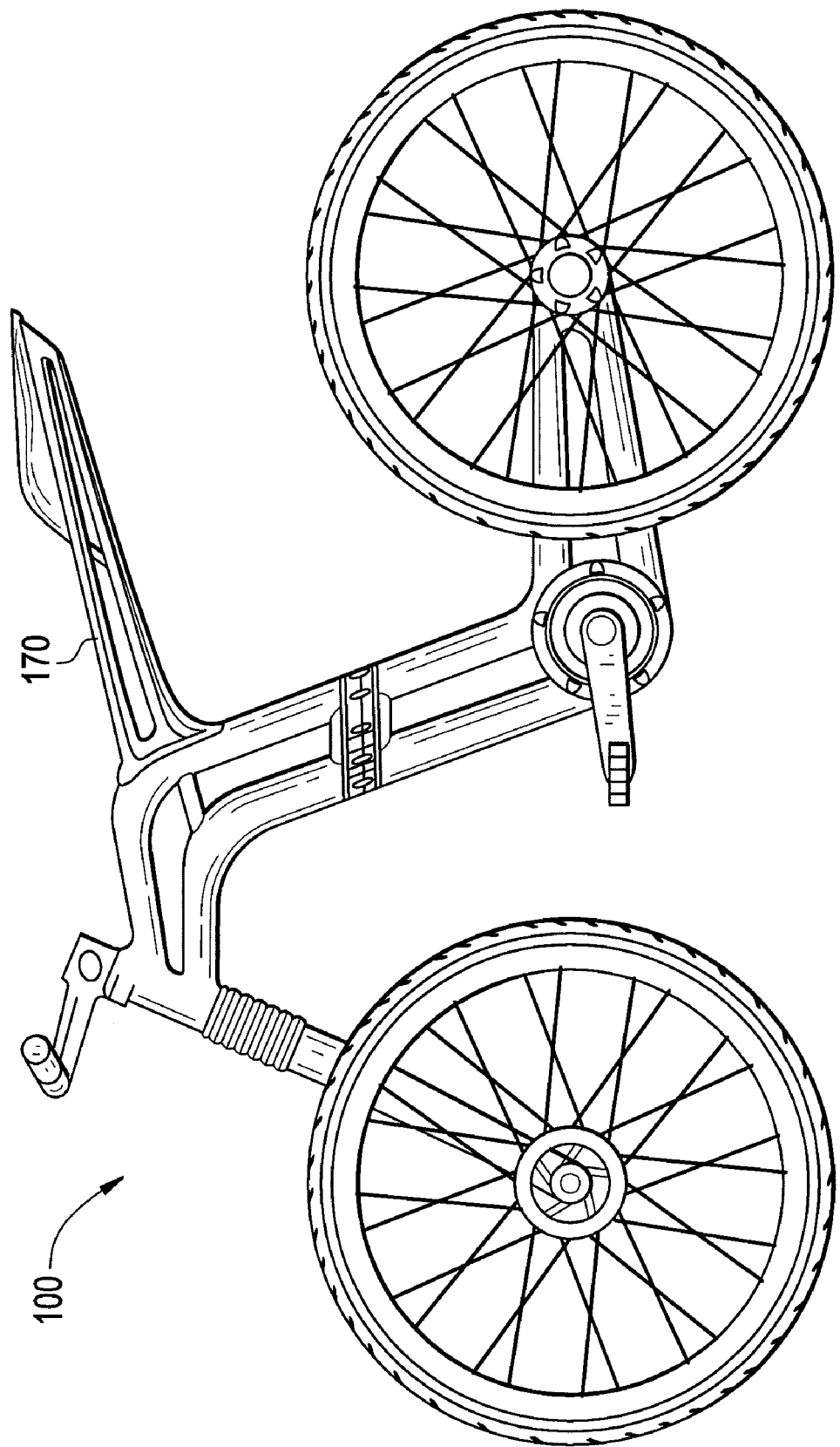
FIG. 2 depicts in left side view an alternative embodiment of a bicycle in accordance with an embodiment of the invention.
Figure 3:
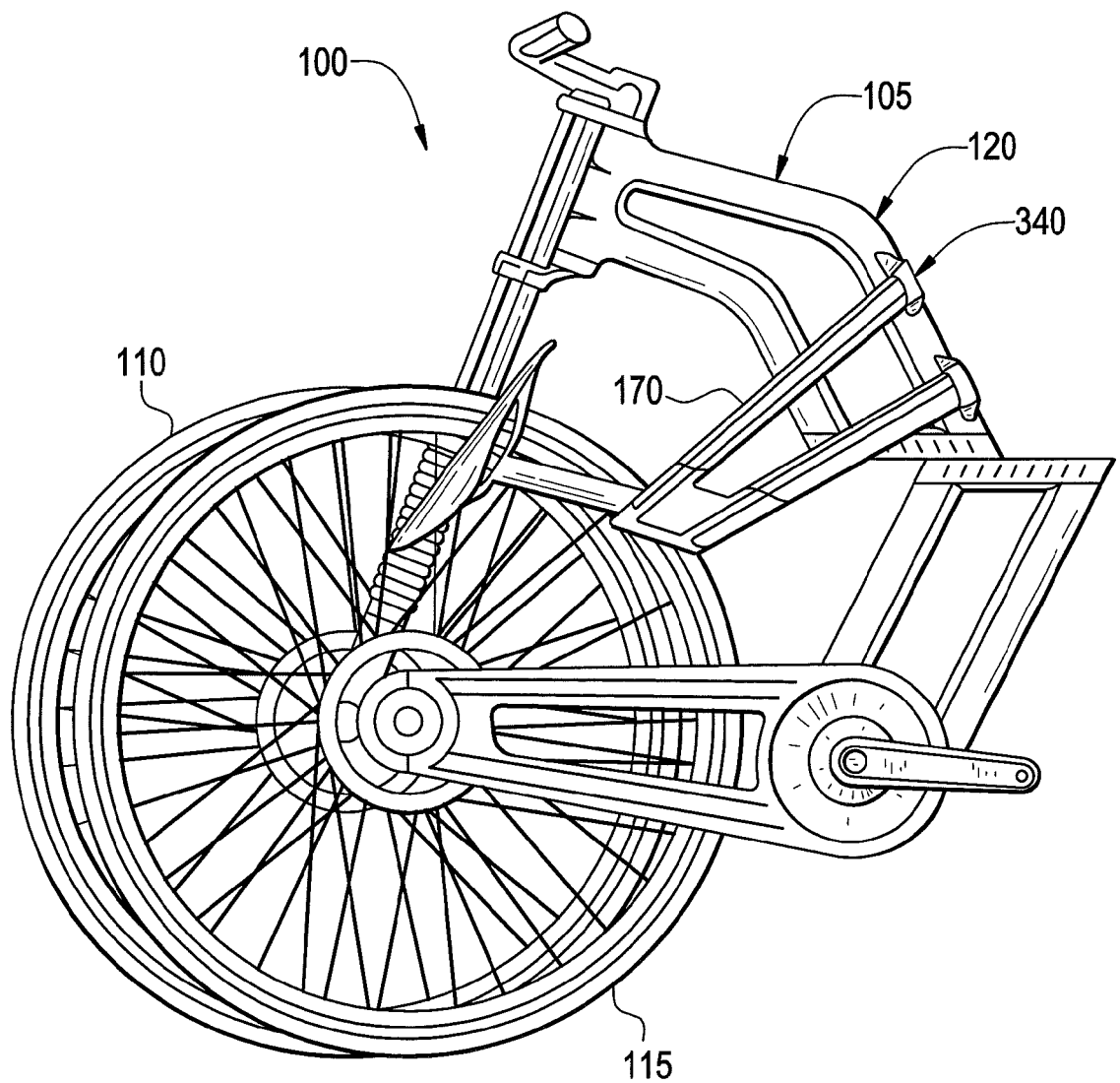
FIG. 3 depicts in right side view the bicycle of FIG. 1 in a folded position.

While additional details of the bicycle frame 105 will be described further below, reference is now briefly made to embodiments depicted in FIGS. 2 and 3. FIG. 2 depicts a bicycle 100 (left side view) similar to that of FIG. 1, but with an alternative arrangement for the seat support 170. FIG. 3 depicts the bicycle 100 (right side view) of FIG. 1 in a folded position by folding the bicycle frame 105 about hinge 175 such that the front wheel 110 is disposed in substantial axial alignment with the rear wheel 115.

Figure 4:
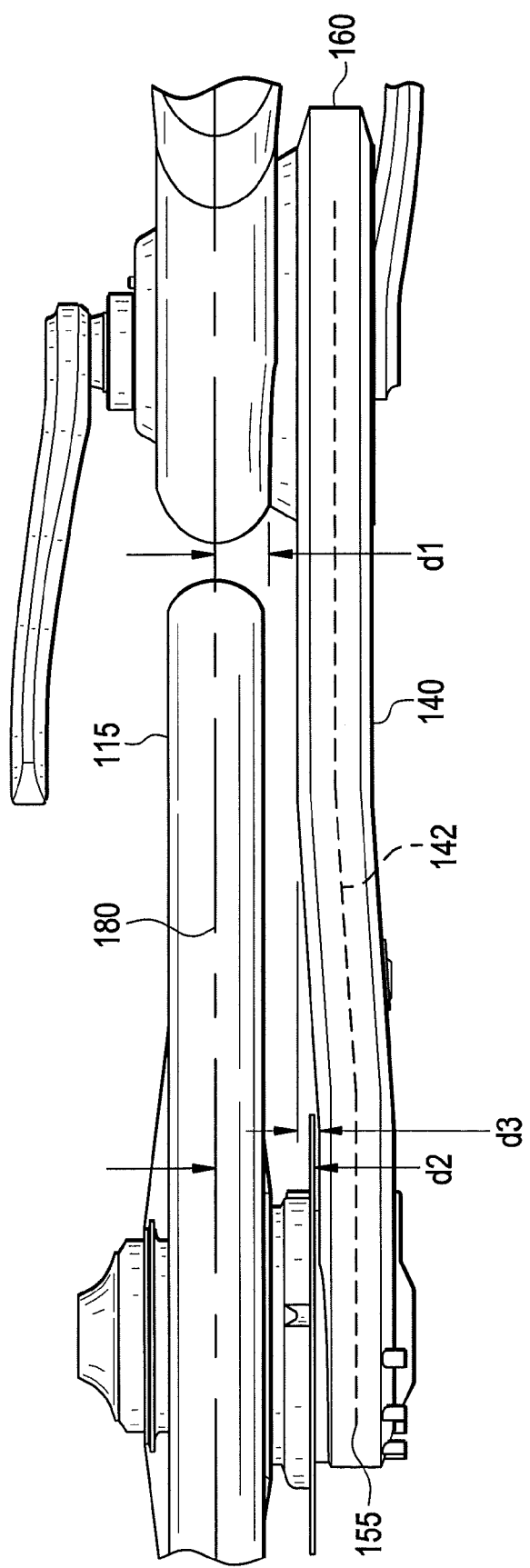
FIG. 4 depicts in top plan view a drive link case in accordance with an embodiment of the invention.

Referring now to FIG. 4 (top plan view), the drive link case 140 in an embodiment is disposed eccentric to the central vertical plane 180 of the frame 105, thereby serving to define a one-sided frame 105. Another feature that serves to define the one-sided frame 105 is the front coupling 130, which is configured and dimensioned to receive a one-sided front wheel support member 135 disposed eccentric to the central vertical plane 180 and disposed on the same side of the front section 120 as the eccentrically disposed drive link case 140 (best seen by referring to FIG. 16 in association with FIG. 1, where reference numerals 105' and 120' of FIG. 16 refer respectively to reference numerals 105 and 120 of FIG. 1, but in the alternative).

In an embodiment, the front sprocket housing 160 is disposed closer to the central plane 180 than is the rear hub housing 155 (that is, distance "d1" is less than distance "d2"), thereby defining the drive link case 140 to have an offset shape, or an s-shape (illustrated by offset dashed center line 142 and offset distance "d3"). An offset drive link case places the front sprocket housing 160 closer to the central vertical plane 180 for improved rider comfort, while positioning the rear hub housing 155 a suitable distance away from the central vertical plane 180 and rear wheel 115 serves to accommodate a suitably sized torque converter assembly (discussed in more detail below) for purposes disclosed herein.

Figure 5:
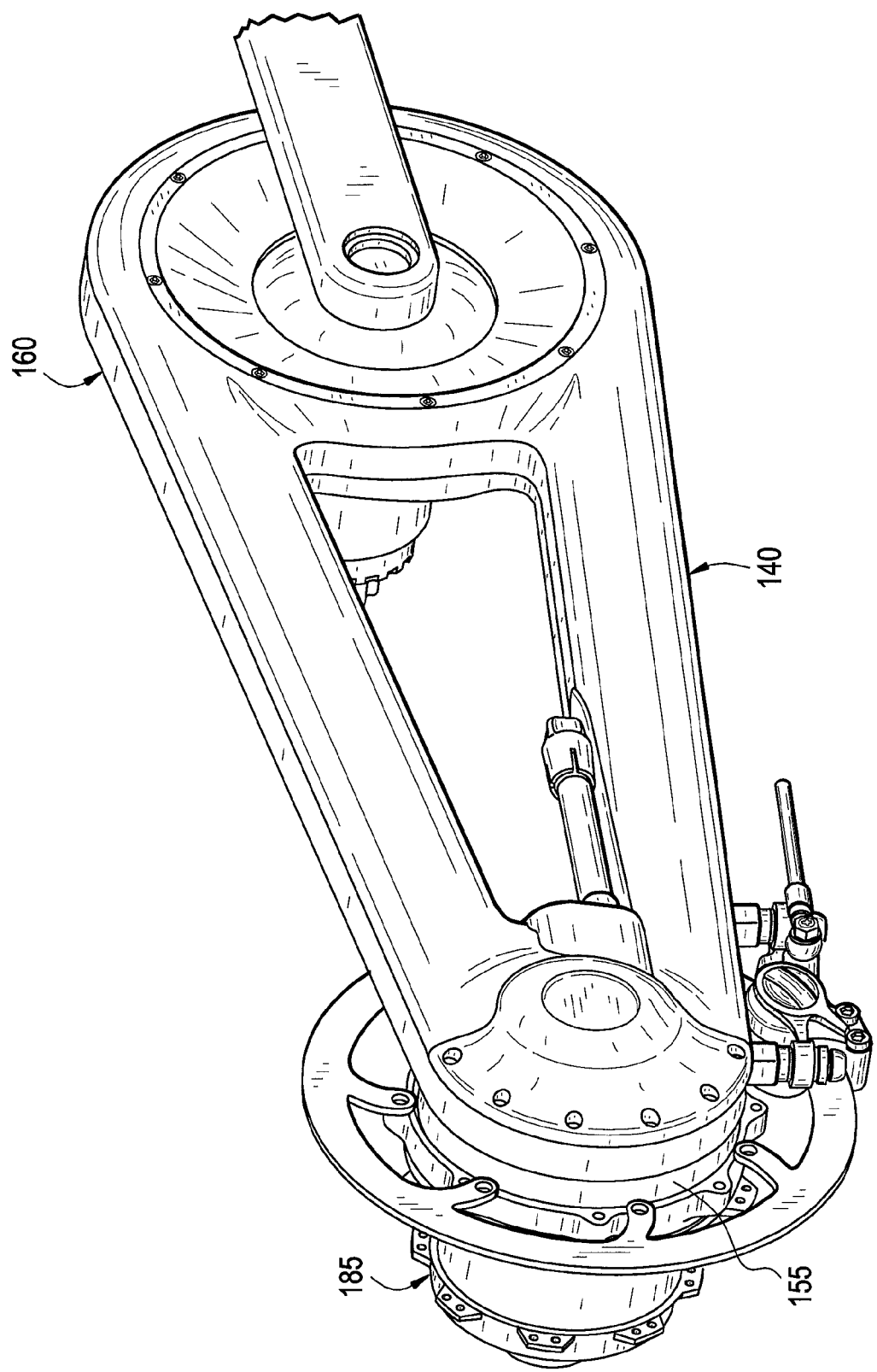
FIG. 5 depicts in right side isometric view the drive link case of FIG. 4.

Referring now to FIG. 5 (right side isometric view), the rear hub housing 155 of the drive link case 140 is configured and dimensioned to secure to and to form an enclosure over an exposed end of a bicycle torque converter assembly 185 (details seen in FIG. 7 discussed further below) configured to transmit torque from a drive link, such as a bicycle drive chain, to the rear wheel 115, where the drive link receives an input torque from a front sprocket (390 in FIG. 20 for example) within the front sprocket housing 160.

Figure 6:
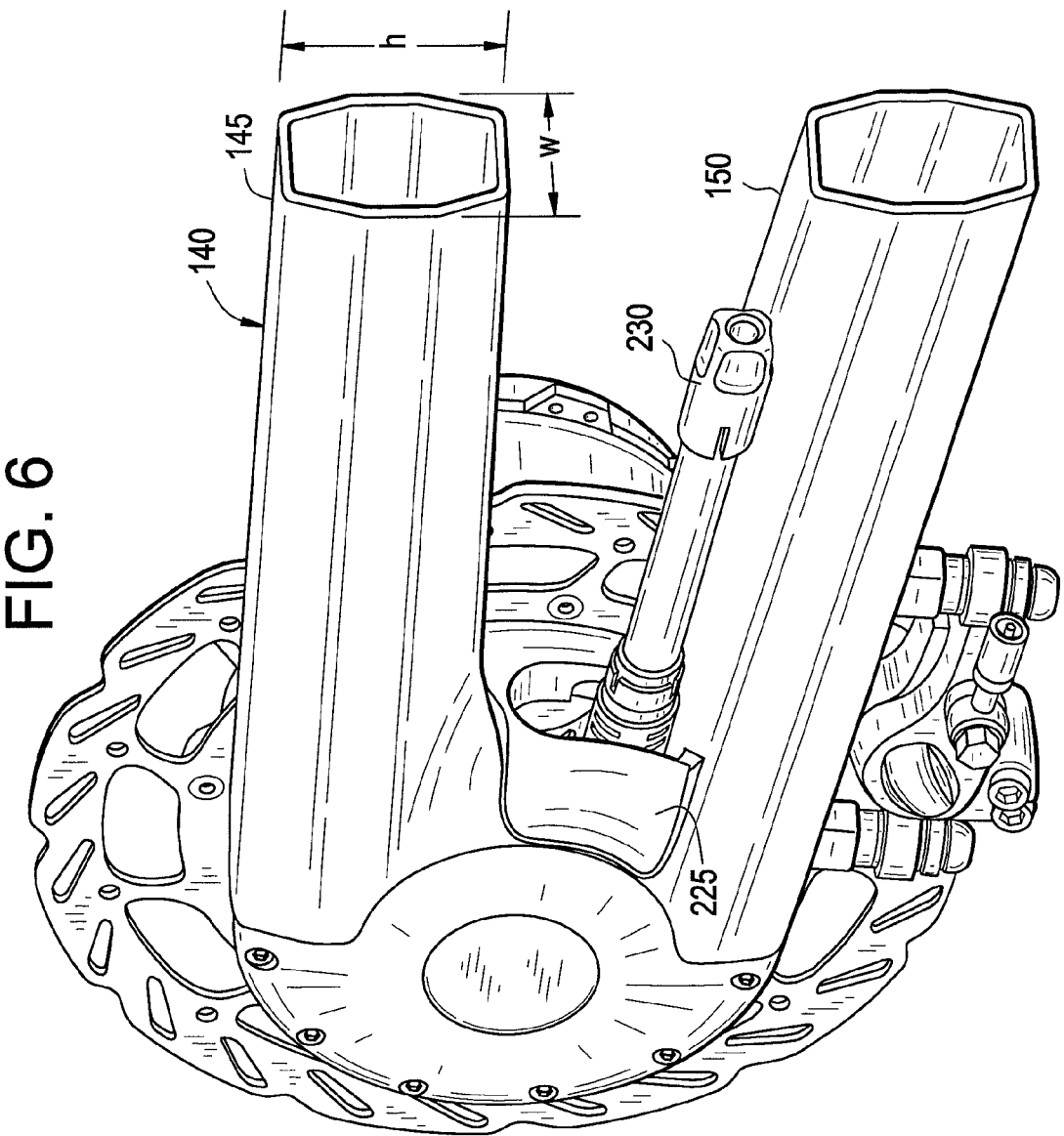
FIG. 6 depicts in right side isometric view a cutaway portion of the drive link case of FIGS. 4 and 5.

Referring to FIGS. 5 and 6 together, the upper tube 145 and lower tube 150 of drive link case 140 are not parallel with each other and have faceted tubular cross sections that form part of a continuous through passage extending from the front sprocket housing 160, through the upper tube 145, around the interior of the rear hub housing 155, through the lower tube 150, and returning to the front sprocket housing 160, thereby providing a drive link case 140 that is configured and dimensioned to receive a bicycle drive chain disposed in a loop traversing a path within the above-mentioned continuous through passage. In an embodiment, the drive link case 140 completely encloses the bicycle chain within the tubular through passage and housings 155, 160. While embodiments depicted and described herein illustrate a faceted tubular cross section for upper and lower tubes 145, 150 having eight facets (planar surfaces), it will be appreciated that the scope of the invention is not so limited and extends to any other number of facets, but preferably is of a number greater than four.

In an embodiment, at least one of the upper tube 145 and the lower tube 150 has an overall cross-sectional height "h" than is greater that a respective overall cross-sectional width "w", which serves to improve the stiffness-to-weight ratio of the drive link case 140.

In an embodiment, material forming the upper tube 145 is continuous and/or non-separable along its respective length and around its respective circumference, material forming the lower tube 150 is continuous and/or non-separable along its respective length and around its respective circumference, material forming the rear hub housing 155 is continuous and/or non-separable with the material forming the upper tube 145 and the material forming the lower tube 150, and material forming the front sprocket housing 160 is continuous and/or non-separable with the material forming the upper tube 145 and the material forming the lower tube 150. Manufacturing methods such as bladder molding are well suited for producing the above-described drive link case 140 with continuous and/or non-separable material flow, thereby enabling production of a one-piece structure having a high strength-to-weight ratio with efficient use of material, and without the need for clamping bolts (sideways clamping bolts used to clamp two halves of a clam shell arrangement for example) that tend to introduce undesirable stress concentrations at the bolt locations. In addition, absence of a separable joint along the length of the upper and lower tubes 145, 150 provides for predictable stress distributions along the respective lengths, with the upper tube 145 experiencing greater compression than the lower tube 150 when the drive link is in tension, thereby allowing for the dimensions and configurations of the upper and lower tubes to be independently optimized for the expected levels of working stress.

A one-piece drive link case 140 having upper and lower tubes 145, 150 with a centrally disposed window 165 provides for an improved torsional stiffness-to-weight ratio by placing structural material of the upper and lower tubes 145, 150 a defined distance away from a central axis defined by a line connecting the center of the rear hub housing 155 with the center of the front sprocket housing 160.

Figure 9:
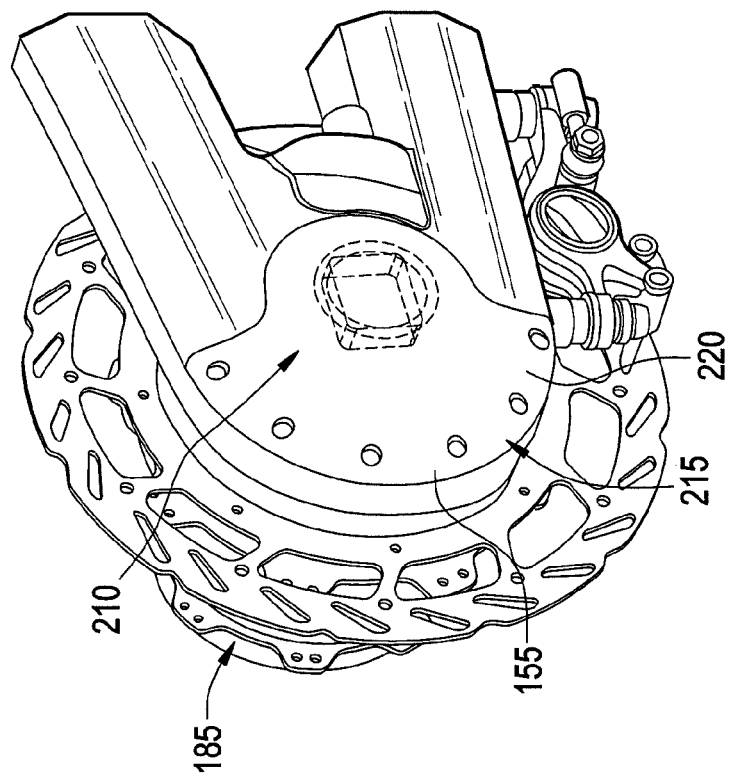
FIGS. 8 and 9 depict in right side isometric view interface features between the drive link case and the torque converter assembly in accordance with an embodiment of the invention.
Figure 8:
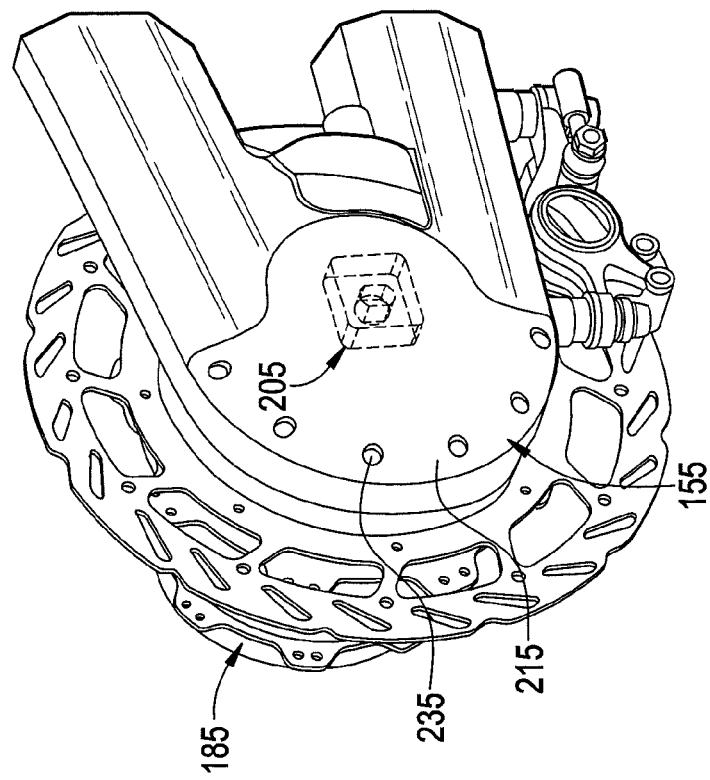

An embodiment of the torque converter assembly 185 partially depicted in FIG. 5 will now be described with reference to FIG. 7 (cross sectional view) and FIGS. 8 and 9 (right side partial isometric view). The rear hub housing 155 of torque converter assembly 185 encloses a set of gears (illustrated generally by reference numeral 190) having a plurality of gear ratios, thereby providing a multi-speed internally geared hub. While FIG. 7 illustrates a certain volume allocated for an arrangement of gears 190, it will be appreciated that the scope of the invention is not so limited and also encompasses other arrangements of gears that are so configured and dimensioned to work in conjunction with a type of bicycle herein disclosed, and especially in conjunction with a type of drive link case 140 herein disclosed. An example of a set of gears 190 in a multi-speed hub that can be shifted from one side of the rear axle is illustrated in U.S. Pat. No. 4,721,013, issued Jan. 26, 1988. Another example of a set of gears 190 in a multi-speed hub is illustrated at http://www.sramimotion.com/de/html/navigation_de.html. The rear hub housing 155 is supported from the drive link case 140 via a cartridge bearing 200 that is axially restrained via a retaining clip (such as a circlip, a c-clip, an e-clip, for example) (not shown but well known in the art). The torque converter assembly 185 has an axis 195. The torque converter assembly 185 has a squared off end 205 that is supported by the rear hub housing 155 via square support 210 formed on the interior of a hub cover 215 (depicted in FIGS. 8 and 9), thereby supporting torque reaction loads between the rear hub housing 155 and the torque converter assembly 185. It should be noted that the torque support (ends 205 in support 210) is absent an axial load transferred to the axle of the bicycle, that is, the bicycle axle is axially free to slide. As also depicted in FIGS. 8 and 9, and as briefly mentioned above, the rear hub housing 155 includes removable cover 215 to provide access to the interior of the rear hub housing 155. Bolts 235 secure the hub cover 215 to the body of the rear hub housing 155 of the drive link case 140.

While reference is made herein to "squared off" end 205 and "square" support 210, it will be appreciated that the scope of the invention is not limited to a "square" geometry and extends to other geometries suitable for the purposes disclosed herein, such as octagonal for example.

While the description herein and the illustration of the various figures describe and show a hub cover 215 that provides only partial access to the interior of drive link case 140 at the rear hub housing 155, an alternative arrangement may have the entire outer half of drive link case 140 removable.

Referring briefly back to FIG. 6, the drive link case 140 also includes an access window 225 configured and sized to receive a hub gear shift cable 230 for operating the multi-speed internally geared hub discussed above.

Figure 10:
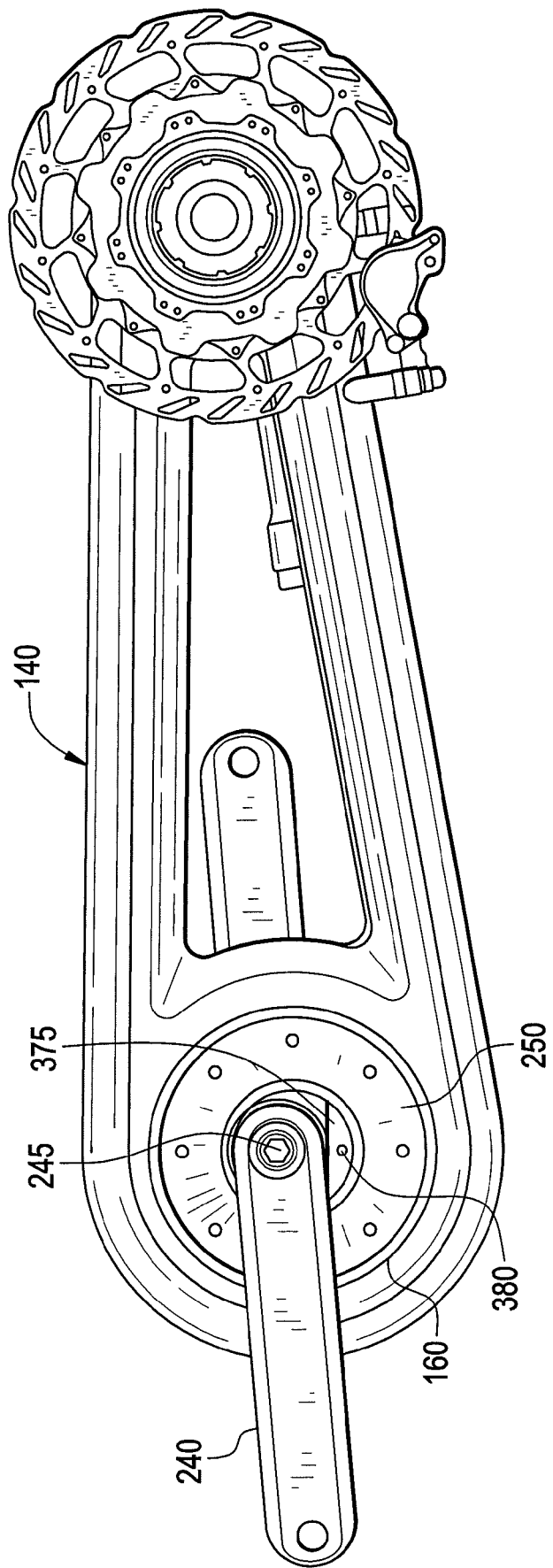
FIG. 10 depicts in left side view the drive link case providing means for tensioning a drive link, such as a bicycle chain, in accordance with an embodiment of the invention.

Referring now to FIG. 10 (left side view), an embodiment includes a means for tensioning the drive link via the crank 240 used to pedal the bicycle. Here, the means for tensioning is provided by an eccentric crank 240, which is arranged on drive link case 140 so that the crank pivot 245 is capable of traversing a circular path about the center of the front sprocket housing 160, thereby causing the front drive sprocket to have eccentric rotation, which in turn tensions the drive link as the crank pivot 245 rotates forward. In an embodiment, the eccentric crank 240 is formed having an internal cylindrical bearing that has an offset core (the core being concentric with crank pivot 245 and therefore generally referred to by reference numeral 245). The front sprocket housing 160 includes an eccentric disc crank cover 250 that is rotatable and removable to provide for installation of and alignment with the eccentric crank 240. An eccentric bottom bracket 375 may be loosened and tightened by bolt 380, which bolts into the frame 105 of the bicycle 100 when the eccentric crank 240 and bottom bracket 375 have been rotated to properly tension the drive link. Once locked in position with the drive link properly tensioned, crank pivot 245 is fixed and crank 240 pivots about crank pivot 245. An embodiment of such an eccentric crank and bottom bracket is disclosed in commonly owned U.S. Pat. No. 7,217,037, issued May 15, 2007, which is herein incorporated by reference in its entirety.

Figure 11:
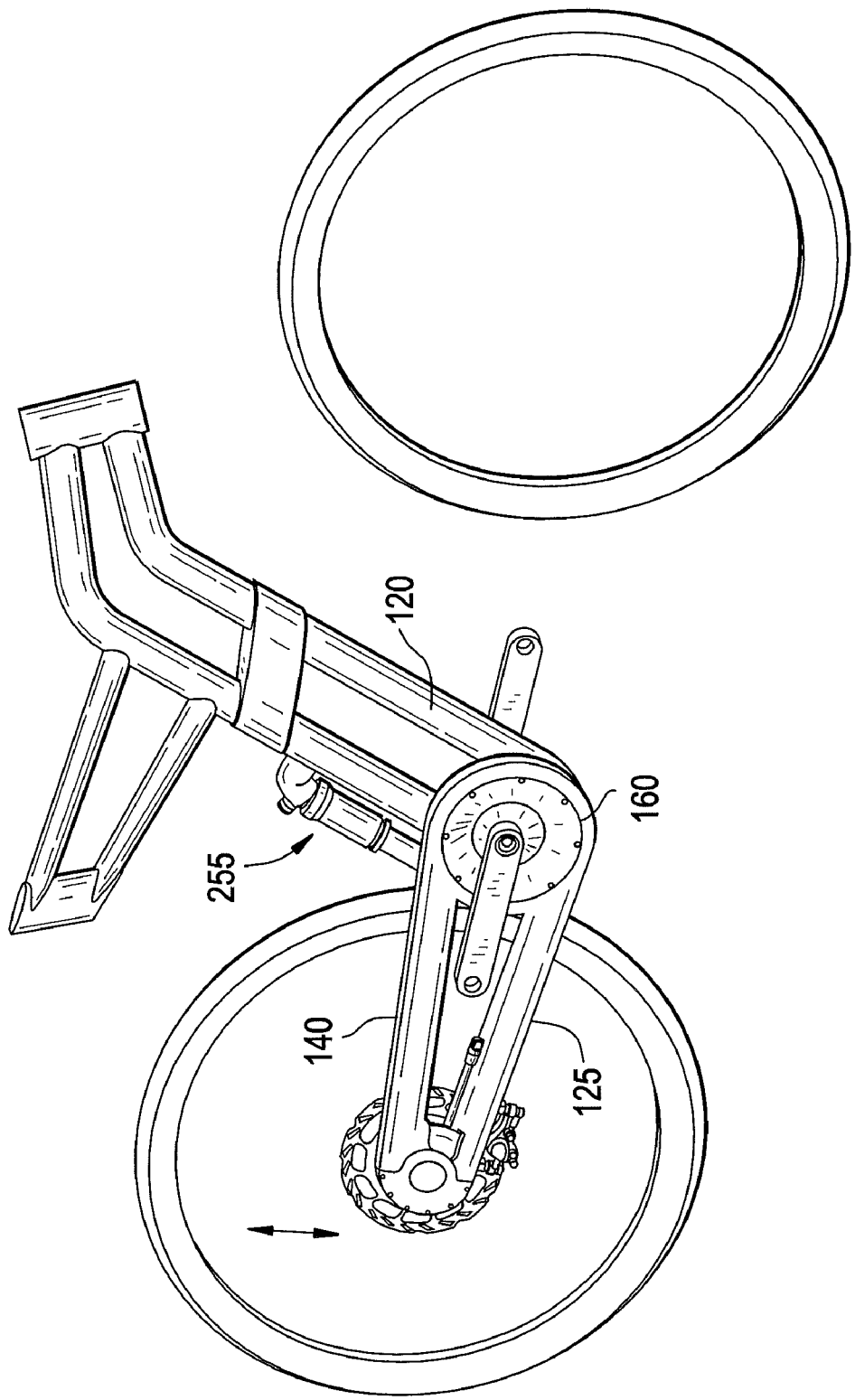
FIG. 11 depicts in right side view a pivotally arranged drive link case in accordance with an embodiment of the invention.
Figure 12:
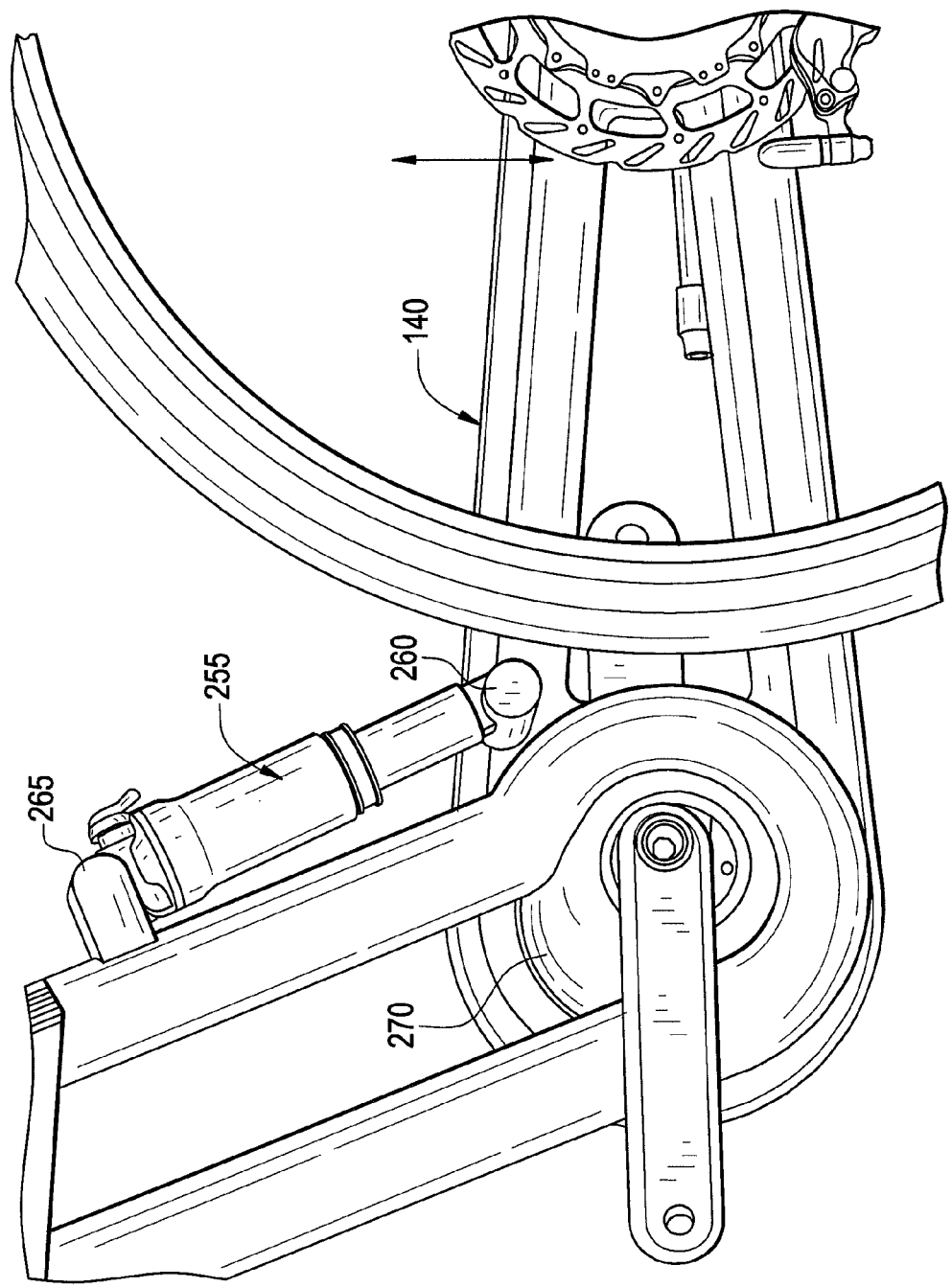
FIG. 12 depicts in left side view the pivotally arranged drive link case of FIG. 11.

In an embodiment, the drive link case 140 is rigidly connected to the front section 120 via the front sprocket housing (via welds, bolts or other suitable fastening means), as depicted generally in FIGS. 1 and 2, thereby resulting in a rigid frame 105 from front section 120 to rear section 125. However, in another embodiment, and with reference now to FIGS. 11 and 12, the drive link case 140 is pivotally connected to the front section 120 as in the form of a swing arm to allow suspension therebetween, thereby providing a means for suspension between the front section 120 and the rear section 125. As depicted in FIGS. 11 and 12, an embodiment of the means for suspension is a shock absorber 255 coupled between the drive link case 140 at a bottom end 260, and the front section 120 at a top end 265 (best seen by referring to FIG. 12). A crank housing 270 provides an axis of rotation of drive link case 140 that is substantially normal to the vertical plane (180, depicted in FIG. 4) of the frame 105.

Referring back to FIG. 1, an embodiment of the front section 120 includes two parallel tubes 275 that extend substantially upward (more upward than forward) from the front sprocket housing 160 of the drive link case 140 to define a first portion 280 of the front section 120, and then extend substantially forward (more forward than upward) toward the front coupling 130 to define a second portion 285 of the front section 120. A rotatable joint, also herein referred to as a hinge, 175 is disposed in the first portion 280 of the front section 120 and has a pivot axis 335 (best seen by reference to FIGS. 13A, B and C) in a near-vertical orientation. The rotatable joint includes a clamping mechanism 290 (best seen by referring to FIGS. 13A, B and C), that rigidly clamps the first portion 280 in alignment with the second portion 285 in the central vertical plane 180 in a manner to make the bicycle frame suitable for riding.

In an embodiment, the first portion 280 and second portion 285 are herein also collectively referred to as the front frame section (generally referred to by reciting reference numerals 280, 285 in combination). However, and with reference to FIG. 16, an alternative embodiment employs a front frame section defined by a rigid substantially triangular form 395 having a top frame member 400, a down frame member 405, and a seat frame member 410, the top frame member 400 extending from the front coupling 130 to an upper end of the seat frame member 410, and the down frame member 405 extending from the top frame member 400 at the front coupling 130 to a lower end of the seat frame member 410, thereby defining the rigid substantially triangular form. The drive link case 140 is connected to the front frame portion (generally referred to by reciting reference numerals 400, 405, 410 in combination) proximate the lower end of the seat frame member 410.

Figure 13A:
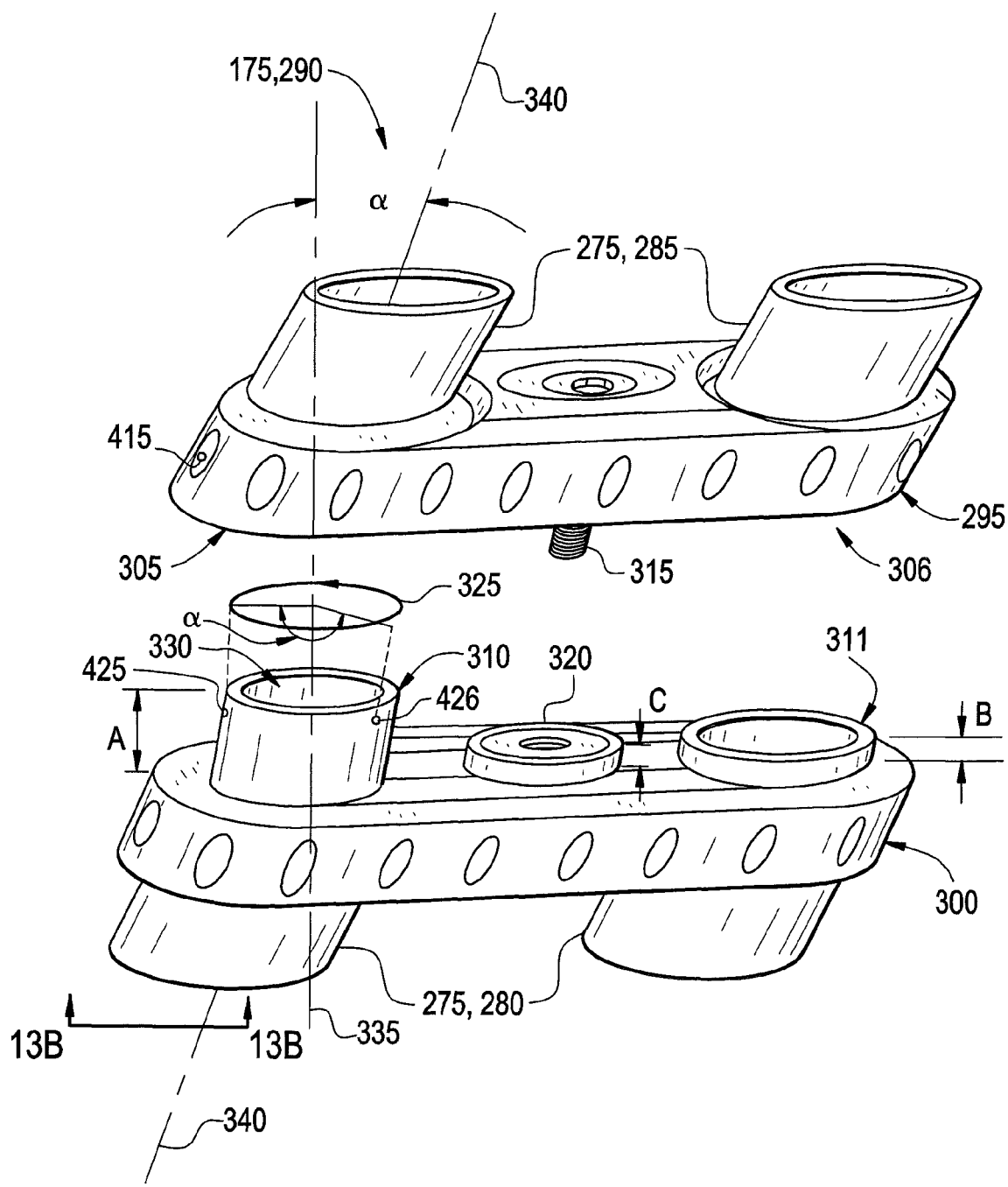
FIGS. 13A, B and C depict in right side view an exemplary frame hinge, also herein referred to as a clamping mechanism or a rotatable joint, in accordance with an embodiment of the invention, where

With reference now to FIGS. 13A, B and C (right side partial isometric view with varying levels of detail), the clamping mechanism 290, which is more generally referred to as hinge 175, includes an upper portion 295 and a lower portion 300, each of the upper 295 and lower 300 portions having at least two interlocking features 305, 306 and 310, 311, respectively, such that the interlocking features 305, 306 of the upper portion 295 engage with the interlocking features 310, 311 of the lower portion 300. For example, but without limitation, interlocking feature 310 (left side of lower portion 300) is a long hollow tube that engages with mating detail of interlocking feature 305 (left side of upper portion 295), and interlocking feature 311 (right side of lower portion 300) is a short hollow tube that engages with mating detail of interlocking feature 306 (right side of upper portion 295). When the interlocking features 305, 306 and 310, 311 are aligned and engaged, a fastener (or any other clamping mechanism suitable for the purposes disclosed herein) 315 is so disposed to threadably engage with threaded boss 320 to rigidly fasten the upper portion 295 to the lower portion 300 with the front 110 and rear 115 wheels disposed and locked in line with each other. As depicted in FIG. 13A, tubes 275 associated with first portion 280 extend out of the bottom of lower portion 300, and tubes 275 associated with second portion 285 extend out of the top of upper portion 295, thereby forming one continuous front section 120 of frame 105 when the upper 295 and lower 300 portions are rigidly coupled. While FIG. 13A depicts a bolt 315 with an internal hex head for rigidly fastening upper and lower portions 295, 300 together, it will be appreciated that the invention is not so limited and also extends to other fasteners suitable for the purposes disclosed herein, such as a bolt with a thumb wheel head or a quick release clamping mechanism, for example. To facilitate rotation of the upper 295 and lower 300 portions, which will be discussed in more detail below, interlocking feature 310 of lower portion 300 has a boss height "A", interlocking feature 311 of lower portion has a boss height "B" that is less than height "A", and threaded boss 320 of lower portion 300 has a boss height "C" that is less than or equal to height "B".

Continuing on with reference to FIGS. 13A, B and C, the rotatable joint, depicted generally by rotation line 325, of hinge 175 is formed by interlocking features 305 and 310 being disposed in line with the rearward tube (left side of FIG. 13A) of the two parallel tubes 275 of the first 280 and second 285 portions. The rotatable joint 325 includes an axial through opening 330 in line with the opening of the rearward tube, thereby providing a passage way for brake and shifting cables to run through the tubular first 280 and second 285 portions of the front section 120 across the rotatable joint 325. Described alternatively, a first interlocking feature 305 of the upper portion 295 and the first interlocking feature 310 of the lower portion 300 each include a pass-through hole 330 providing a through passage at the pivot 325 from one side of the hinge 175 (clamping mechanism 290) to the other side for passage of cables therethrough.

As depicted in FIG. 13A, the pivot axis 335 is arranged in a near-vertical orientation even though the central axis 340 passing through tubes 275 is not in a near-vertical orientation. Described alternatively, the central axis 340 passing through tubes 275 forms an angle α with respect to the pivot axis 335 that is greater than zero degrees. As such, hinge 175 permits rotation of the front section 120 relative the rear section 125 with the front 110 and rear 115 wheels staying substantially level with each other and with a horizontal plane (the ground).

Figure 13C:
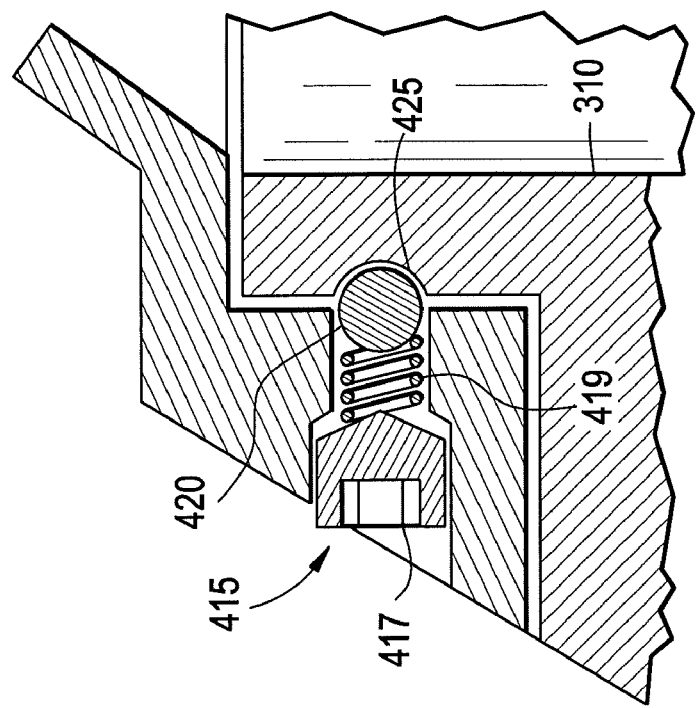
FIG. 13C is an expanded view of a portion of FIG. 13B.
Figure 13B:
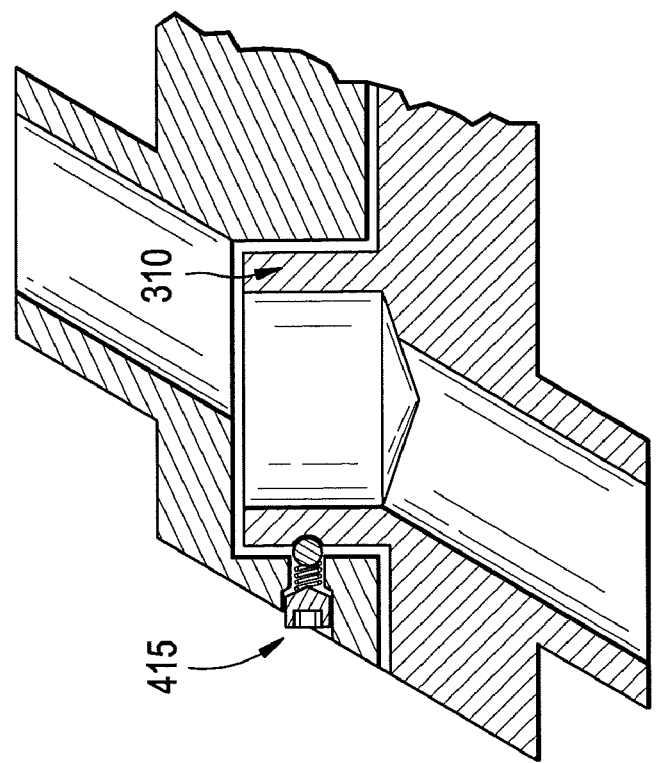
FIG. 13B is a detailed section view of a portion of FIG. 13A.

Notwithstanding the foregoing, hinge 175 may be described alternatively as being disposed in the first portion 280 such that: the front 110 and rear 115 wheels are lockable in line with each other suitable for riding; at least a portion of the front section 120 is pivotally displaceable with respect to the rear section 125 such that the front 110 and rear 115 wheels are not in line with each other; and, at least a portion of the front section 120 and the rear section 125 are positionally fixable together via a first detent in an aligned condition suitable for riding, and via a second detent in a pivotally displaced condition suitable for storage. An example detent is a spring-biased ball detent unit 415 as illustrated in FIGS. 13A, B and C, but best seen by reference to FIGS. 13B and C, which depict the spring-biased ball detent unit 415 having an end support cap 417, a compression spring 419 and a ball bearing 420 disposed substantially in the body of upper portion 295, with the ball bearing 420 being biased by the compression spring 419 to engage with a detents 425 and 426 disposed at the outer surface of the first interlocking feature 310 of the lower portion 300. Detent 425 correlates with the first detent suitable for riding, and detent 426 correlates with the second detent suitable for storage. While detents 425, 426 are depicted as indentations in the outer surface of first interlocking feature 310 for receiving the spring-loaded ball bearing 420, the detents may be of any geometry suitable for the purposes disclosed herein, all of which are considered within the scope of embodiments of the invention. In an embodiment, detents 425 and 426 are displaced 160-degrees apart from each other (angle α, FIG. 13A), but may be displaced at any angle suitable for the purposes disclosed herein.

In response to the interlocking features 305, 306 of the upper portion 295 and the interlocking features 310, 311 of the lower portion 300 being engaged with each other, and in response to the fastener 315 fastening the upper portion 295 to the lower portion 300, the upper 295 and lower 300 portions of the hinge 175 are prevented from having any relative movement between them. Also, in response to the fastener 315 being loosened and not fastening the upper portion 295 to the lower portion 300, the upper 295 and lower 300 portions of the hinge 175 are prevented from having rotational relative movement between them until the upper 295 and lower 300 portions are partially separated from each other via translational relative movement between them. Furthermore, in response to the upper 295 and lower 300 portions being only partially separated from each other, the first 305 of the interlocking features of the upper portion 295 and the first 310 of the interlocking features of the lower portion 300 remain engaged with each other and act as a pivot, and the second 306 of the interlocking features of the upper portion 295 and the second 311 of the interlocking features of the lower portion 300 are disengaged from each other thereby allowing the upper portion 295 to pivot on the lower portion 300 about the pivot 325 defined by the pair of first interlocking features 305, 310. To fold and store the bicycle 100, the upper and lower portions 295, 300 are partially separated as discussed above, and the frame sections 120, 125 pivoted relative to each other via hinge 175 until the ball bearing 420 of the spring-biased ball detent unit 415 snaps into the detent 426 on the first interlocking feature 310. To unfold the bicycle, manual pivoting of the frame sections about the hinge is sufficient to drive the ball bearing 420 out of the detent 426 by compression of the spring 419. Continued unfolding to align the front 120 and rear 125 sections results in spring-biased ball detent unit 415 snapping into detent 425. The spring-biased ball detent unit 415 engages and disengages in a similar manner with respect to the two detents 425, 426.

With brief reference back to FIGS. 1 and 3, another embodiment of the invention disclosed herein includes a seat support 170 attached to the front section 120 via a seat support clamp 340 that permits the seat support 170 to be disposed in a first position (as depicted in FIG. 1) suitable for riding, and in a second position (as depicted in FIG. 3) suitable for storing. Seat support clamp 340 may be arranged as a pivotal member, or as a rigid member capable of providing the aforementioned two positions or enabling separation and removal of the seat support 170 from the front section 120.

Figure 14:
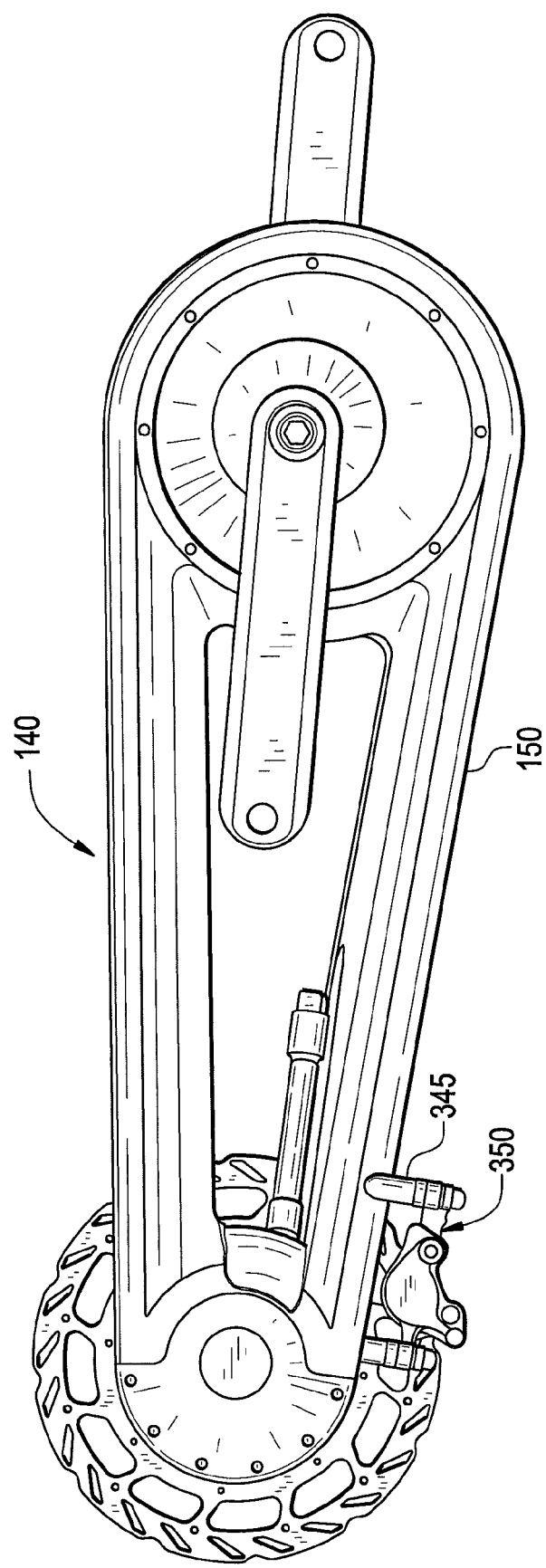
FIG. 14 depicts in right side view the drive link case of FIG. 6 with optional features in accordance with an embodiment of the invention.
Figure 15:
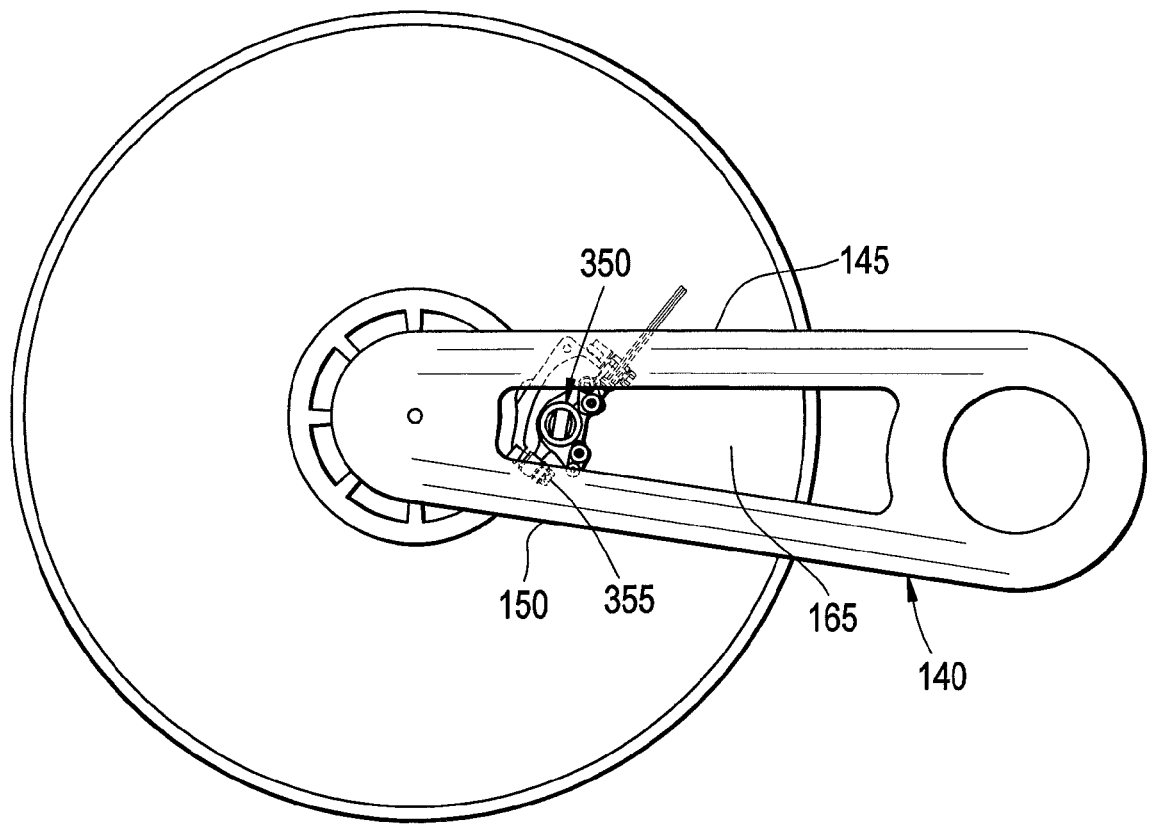
FIG. 15 depicts in right side view the drive link case of FIGS. 5 and 6 with an alternative arrangement for a brake caliper in accordance with an embodiment of the invention.

In addition to all of the foregoing and with reference to FIG. 14, embodiments of the invention may include other features, such as the drive link case 140 including supports 345 integrally arranged with lower tube 150 for mounting a disc brake caliper 350 on the underside of lower tube 150. Alternatively and with reference to FIG. 15, disc brake caliper 350 may be mounted within the window 165 of drive link case 140 by supports 355 disposed on the underside of upper tube 145 and on the upperside of lower tube 150.

Figure 16:
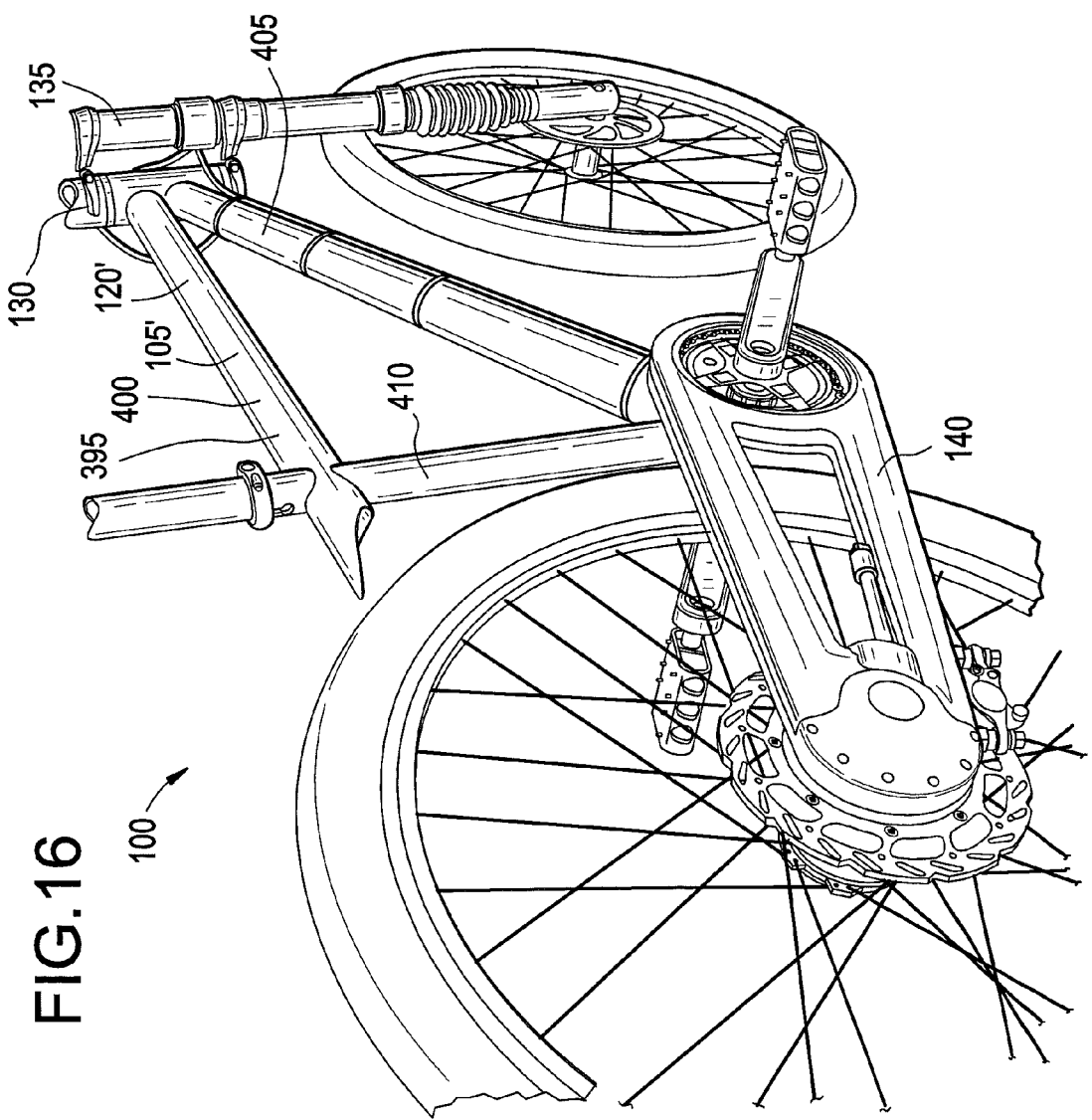
FIGS. 16-18 depict right side view, right side view, and left side view, respectively, of a bicycle or portions thereof in accordance with an embodiment of the invention.
Figure 17:
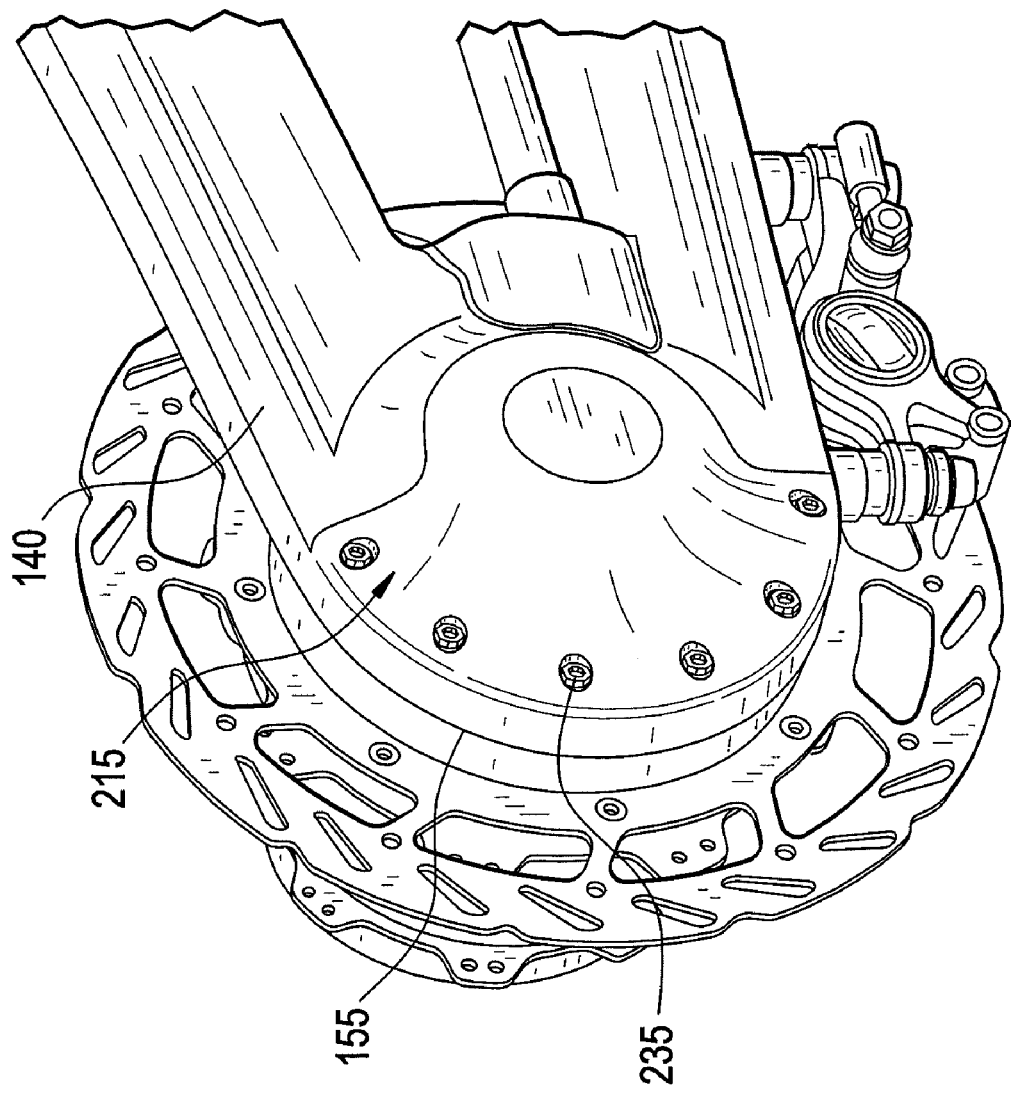
Figure 18:
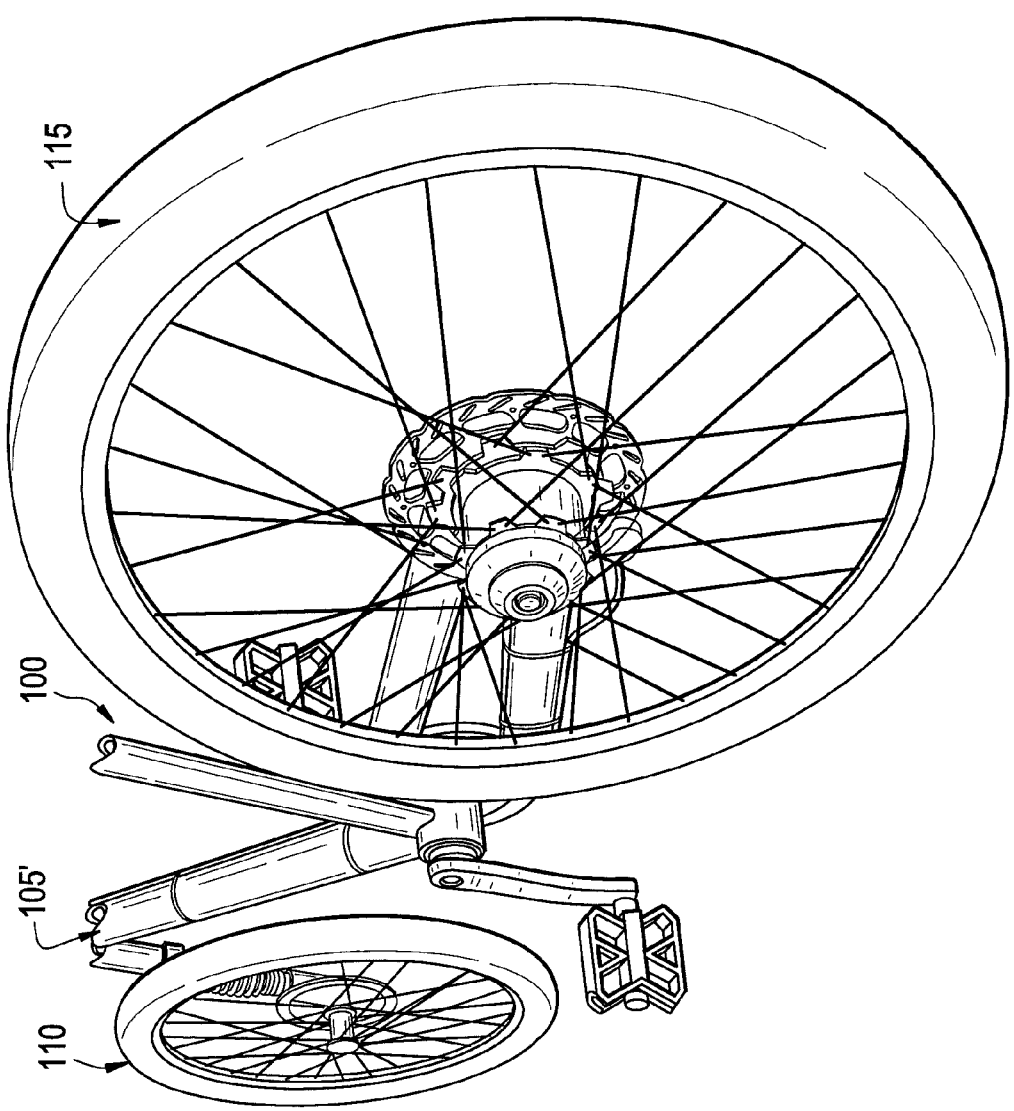

FIGS. 16-18 illustrate an alternative structure for the frame 105 (referred to in FIG. 16 by reference numeral 105') as compared to those illustrated in FIGS. 1-3 and as discussed above. For example, FIGS. 16-19 illustrate a single-sided bicycle frame structure with front section 120 (referred to in FIG. 16 by reference numeral 120') having a triangular form 395 (as discussed above), in combination with a drive link case 140 as discussed above, but absent a hinge 175.

Figure 19:
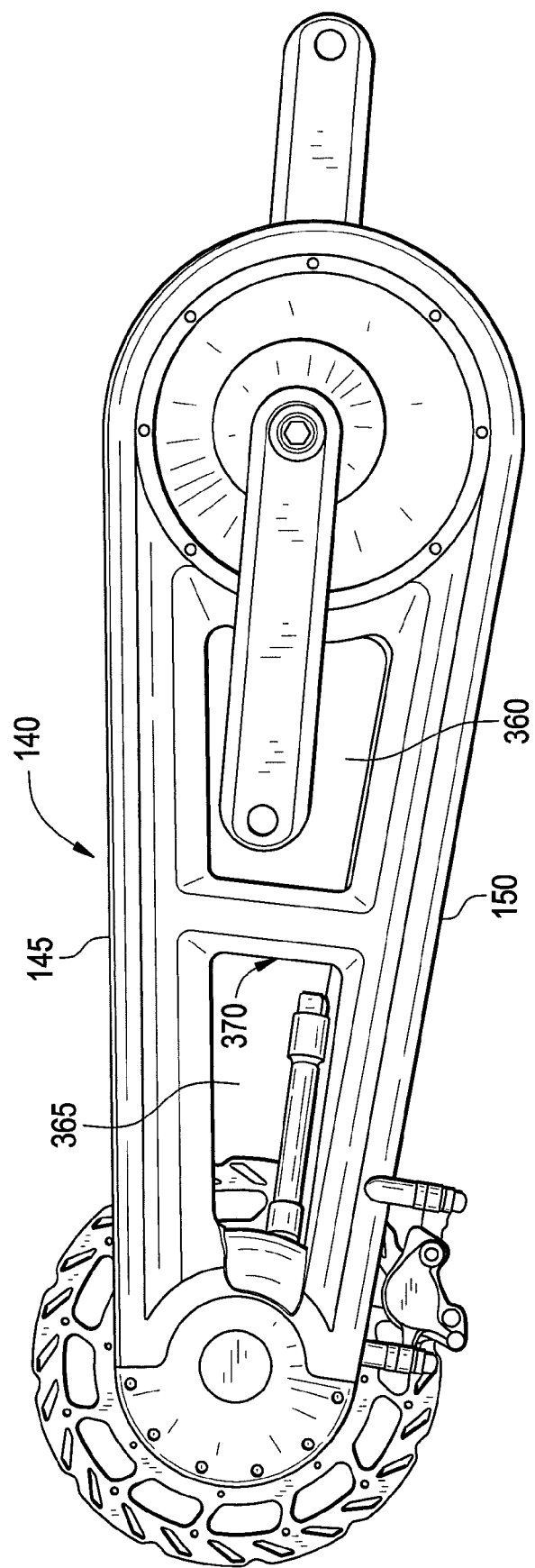
FIG. 19 depicts in right side view an alternative drive link case to that depicted in FIG. 14 in accordance with an embodiment of the invention.

FIG. 19 illustrates an alternative embodiment for the drive link case 140 having two windows 360, 365 formed by a central tubular rib 370 extending between the upper tube 145 and the lower tube 150 such that the above-described opening 165 is now defined by a first opening (window 360) and a second opening (window 365). In an embodiment, material forming the tubular rib 370 is continuous with material forming the upper tube 145 and material forming the lower tube 150. Use of the central tubular rib 370 provides an additional structural feature to increase the stiffness of the drive link case 140.

Figure 20:
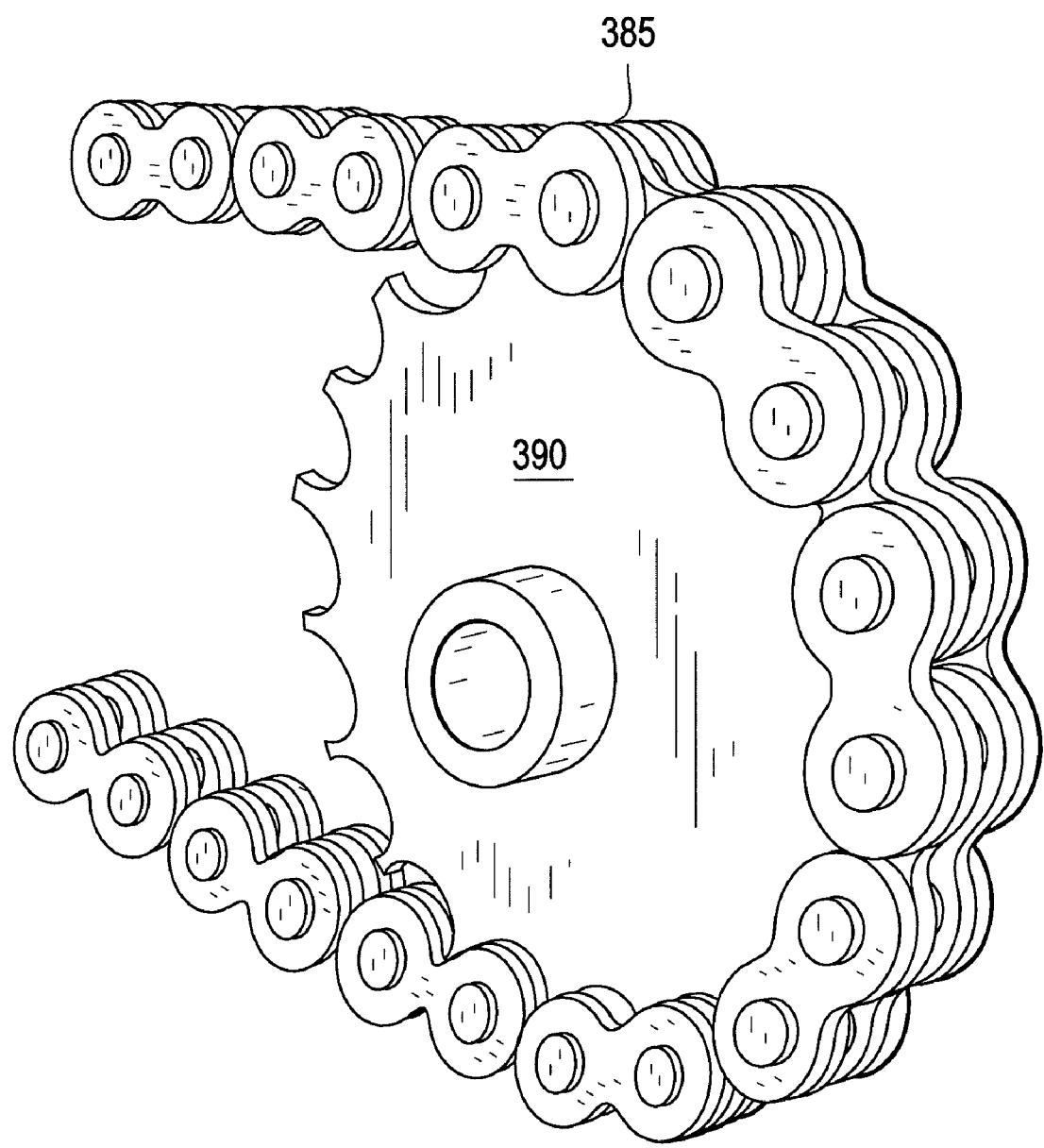
FIG. 20 depicts in right side isometric view an exemplary drive link for use in accordance with an embodiment of the invention.

FIG. 20 illustrates an exemplary drive link 385, herein illustrated as a bicycle chain, disposed around a front sprocket 390 for use in accordance with embodiments described herein.

While certain combinations of features relating to a bicycle have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed.

In view of all of the foregoing, it will be appreciated that embodiments of the invention are well suited for implementation as an electric-drive or an electric-assisted-drive bicycle, where a battery and/or electric drive mechanism may be disposed in any of the following locations: the window space between the tubes 275 of the first or second portions 280, 285 of front section 120 (see FIG. 1); the window space 173 between the upper and lower tubes 171, 172 of seat support 170 (see FIG. 1); the space below the seat support 170 and proximate the first portion 280 of the front section 120 (see FIG. 1); and, the window space defined by the triangular form 395 of frame 105' (see FIG. 16). Control and/or electric harness wires for such an electric-drive or electric-assisted-drive bicycle could run alongside or through any of the tubular frame sections discussed above, including passing through the axial through opening 330 of rotatable joint 325 of hinge 175 (see FIG. 13). Any and all such electric-drive or electric-assisted-drive bicycles are contemplated herein.

As disclosed, some embodiments of the invention may include some of the following advantages: a structural single sided chain case with a central window, absent a third leg (seat stay tube) extending from top of seat tube to end of chain stay tube typically found in triangular rear sections of bicycle frames; a structural single sided chain case usable with a single speed or with a multi-gear hub; a structural single sided chain case usable with a disc brake assembly; a structural single sided chain case having an opening for receiving a hub gear shift cable; a structural single sided chain case having a removable torque transfer rear cover for chain fit and adjustment; an eccentric crank for chain tension adjustment; an eccentric rotatable and removable crank cover for crank installation and alignment with eccentric crank; a single sided foldable bicycle with a structural single sided chain case; a rotatable joint for a single sided foldable bicycle having a through passage for gear and brake cables; a rotatable joint for a single sided foldable bicycle having a substantially vertical pivot axis thereby allowing the front wheel to be folded against the rear wheel with the axles substantially aligned; a drive link case having a continuous flow of material among the various sections for an improved strength-to-weight and/or stiffness-to-weight ratio; a drive link case having a continuous flow of material among the various sections that eliminate localized stress concentrations occurring at bolted joints such as those found in bolted clam shell type chain case designs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bicycle frame configured to receive front and rear wheels, the frame comprising:
a front section comprising a front frame portion having a front coupling configured and dimensioned to receive a front wheel support member and to allow a rotational degree of freedom between the front coupling and the front wheel support member, the front frame portion defining a central vertical plane of the frame; and
a rear section comprising a drive link case, the drive link case comprising an upper tube, a lower tube, a rear hub housing, and a front sprocket housing all integrally arranged with each other to form a rigid drive link case having an opening disposed between the upper and lower tubes, the drive link case being connected to the front frame portion via the front sprocket housing;
the drive link case being disposed eccentric to the central vertical plane such that the rear section is configured as a one-sided rear section, the drive link case being cantilevered rearward from the front sprocket housing, the front frame portion extending forward from the front sprocket housing.

2. The bicycle frame of claim 1, wherein:
the rear hub housing is configured to receive a torque converter assembly having a set of gears that provide a multi-speed internally geared hub;
the drive link case comprises one or more removable covers to provide access to an interior of the drive link case for removing and replacing a drive link, the drive link being defined by a bicycle drive chain disposed in a loop traversing a path extending from the front sprocket housing, through the upper tube, around an interior of the rear hub housing, through the lower tube, and returning to the front sprocket housing, the one or more removable covers including a rear hub cover; and
wherein the torque converter assembly is torsionally constrained by the rear hub cover.

3. The bicycle frame of claim 1, wherein:
material forming the upper tube is non-separable along its respective length and around its respective circumference;
material forming the lower tube is non-separable along its respective length and around its respective circumference;
material forming the rear hub housing is non-separable with the material forming the upper tube and the material forming the lower tube; and
material forming the front sprocket housing is non-separable with the material forming the upper tube and the material forming the lower tube.

4. The bicycle frame of claim 3, wherein:
at least one of the upper tube and the lower tube has an overall cross-sectional height that is greater than a respective overall cross-sectional width; and
the upper and lower tubes are disposed non-parallel to each other.

5. The bicycle frame of claim 1, wherein:
at least one of the upper tube and the lower tube has a tubular cross section with eight surfaces.

6. The bicycle frame of claim 1, wherein the rear section is fixedly and immovably connected to the front section.

7. The bicycle frame of claim 1, wherein the drive link case further comprises a tubular rib extending between the upper tube and the lower tube such that the opening is defined by a first opening and a second opening, material forming the tubular rib being non-separable with material forming the upper tube and material forming the lower tube.

8. The bicycle frame of claim 1, wherein:
the front frame portion comprises a rigid substantially triangular form having a top frame member, a down frame member, and a seat frame member, the top frame member extending from the front coupling to an upper end of the seat frame member, and the down frame member extending from the top frame member at the front coupling to a lower end of the seat frame member, thereby defining the rigid substantially triangular form;
the drive link case being connected to the front frame portion proximate the lower end of the seat frame member;
wherein the front sprocket housing is closer to the central vertical plane than is the rear hub housing thereby defining the drive link case to have an offset shape.

9. The bicycle frame of claim 1, wherein:
the front frame portion comprises two tubes extending parallel to each other more upward than forward from the front sprocket housing of the drive link case, thereby defining a first portion, and then extending more forward than upward toward the front coupling, thereby defining a second portion.

10. The bicycle frame of claim 9, further comprising:
a rotatable joint comprising a detent and a displaceable detent-engaging unit, the rotatable joint disposed in the first portion and having a pivot axis in a near-vertical orientation, the rotatable joint comprising a clamping mechanism that rigidly clamps the first portion in alignment with the second portion in the central vertical plane in a manner to make the bicycle frame suitable for riding, the rotatable joint being positionally fixable via the detent and detent-engaging unit in a pivotally displaced unclamped condition that makes the bicycle frame suitable for storage.

11. The bicycle frame of claim 10, further comprising:
a seat support attached to the front frame portion via a seat support clamp that permits the seat support to be disposed in a first position suitable for riding and in a second position suitable for storing, the seat support comprising an upper support and a lower support with an opening disposed therebetween.

12. The bicycle frame of claim 9, further comprising:
a frame hinge comprising a detent and a displaceable detent-engaging unit, the frame hinge disposed in the first portion such that: the front and rear wheels are lockable in line with each other suitable for riding; at least a portion of the front section is pivotally displaceable with respect to the rear section such that the front and rear wheels are not in line with each other; and, at least a portion of the front section and the rear section are positionally fixable together via the detent and detent-engaging unit in a pivotally displaced condition suitable for storage.

13. The bicycle frame of claim 9, further comprising:
a frame hinge comprising an upper portion and a lower portion, the upper and lower portions being movable with respect to each other in both translation and rotation when the bicycle frame is in a condition suitable for storage, and the upper and lower portions being locked with respect to each other to prevent both translation and rotation therebetween when the bicycle frame is in a condition suitable for riding, wherein the upper and lower portions form an internal cable passage way therebetween when the bicycle frame is in the condition suitable for riding, and when the bicycle frame is in the condition suitable for storage.

14. A bicycle frame configured to receive front and rear wheels, the frame comprising:
a front section comprising a front frame portion having a front coupling configured and dimensioned to receive a front wheel support member and to allow a rotational degree of freedom between the front coupling and the front wheel support member, the front frame portion defining a central vertical plane of the frame; and
a rear section comprising a drive link case, the drive link case comprising an upper tube, a lower tube, a rear hub housing, and a front sprocket housing all integrally arranged with each other to form a rigid drive link case having an opening disposed between the upper and lower tubes, the drive link case being connected to the front frame portion via the front sprocket housing;
the drive link case being disposed eccentric to the central vertical plane and being cantilevered rearward from the front sprocket housing, the front frame portion extending forward from the front sprocket housing;
wherein the front sprocket housing is closer to the central vertical plane than is the rear hub housing thereby defining the drive link case to have an offset shape.

15. The bicycle frame of claim 14, wherein:
the drive link case is pivotally connected to the front frame portion about a frame axis substantially normal to the central vertical plane of the frame, the drive link case forming a swing arm to allow suspension between the front frame portion and the drive link case; and further comprising:
a suspension link disposed between the front frame portion and the drive link case.

16. The bicycle frame of claim 15, wherein the suspension link comprises a shock absorber.

17. The bicycle frame of claim 15, wherein:
the front frame portion comprises two tubes extending parallel to each other more upward than forward from the front sprocket housing of the drive link case, thereby defining a first portion, and then extending more forward than upward toward the front coupling, thereby defining a second portion;
and further comprising a frame hinge disposed in the first portion to pivotally connect the two tubes.

18. The bicycle frame of claim 15, wherein:
the front frame portion comprises a rigid substantially triangular form having a top frame member, a down frame member, and a seat frame member, the top frame member extending from the front coupling to an upper end of the seat frame member, and the down frame member extending from the top frame member at the front coupling to a lower end of the seat frame member, thereby defining the rigid substantially triangular form;
the drive link case being connected to the front frame portion proximate the lower end of the seat frame member.

19. A drive link case for a bicycle frame, comprising:
an upper tube, a lower tube, a rear hub housing, and a front sprocket housing all integrally arranged with each other to form a rigid drive link case having an opening disposed between the upper and lower tubes; wherein:
the upper and lower tubes are disposed non-parallel to each other;
at least one of the upper tube and the lower tube has a cross-sectional height that is greater than a respective cross-sectional width;
wherein the rear hub housing is laterally offset from the front sprocket housing thereby defining the drive link case to have an offset shape;
material forming the upper tube is non-separable along its respective length and around its respective circumference;
material forming the lower tube is non-separable along its respective length and around its respective circumference;
material forming the rear hub housing is non-separable with the material forming the upper tube and the material forming the lower tube; and
material forming the front sprocket housing is non-separable with the material forming the upper tube and the material forming the lower tube.

20. The drive link case of claim 19, wherein:
at least one of the upper tube and the lower tube has a tubular cross section with eight surfaces.

21. The drive link case of claim 19, further comprising:
a tubular rib extending between the upper tube and the lower tube such that the opening is defined by a first opening and a second opening, material forming the tubular rib being non-separable with material forming the upper tube and material forming the lower tube.

22. A bicycle frame configured to receive front and rear wheels, the frame comprising:
a front section comprising a front frame portion having a front coupling configured and dimensioned to receive a front wheel support member and to allow a rotational degree of freedom between the front coupling and the front wheel support member, the front frame portion defining a central vertical plane of the frame; and
a rear section comprising a drive link case, the drive link case comprising an upper tube, a lower tube, a rear hub housing, and a front sprocket housing all integrally arranged with each other to form a rigid drive link case having an opening disposed between the upper and lower tubes, the drive link case being connected to the front frame portion via the front sprocket housing;
the drive link case being disposed eccentric to the central vertical plane and being cantilevered rearward from the front sprocket housing, the front frame portion extending forward from the front sprocket housing; and
a seat support attached to the front frame portion via a seat support clamp that permits the seat support to be disposed in a first position suitable for riding and in a second position suitable for storing, the seat support comprising an upper support and a lower support with an opening disposed therebetween.

* * * * *